United States Patent
Ding et al.

(10) Patent No.: US 9,478,035 B2
(45) Date of Patent: Oct. 25, 2016

(54) 2D/3D LOCALIZATION AND POSE ESTIMATION OF HARNESS CABLES USING A CONFIGURABLE STRUCTURE REPRESENTATION FOR ROBOT OPERATIONS

(71) Applicant: Seiko Epson Corporation, Tokyo (JP)

(72) Inventors: Yuanyuan Ding, Santa Clara, CA (US); Jing Xiao, Cupertino, CA (US); Kenji Fukasawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/840,374

(22) Filed: Aug. 31, 2015

(65) Prior Publication Data

US 2015/0371391 A1 Dec. 24, 2015

Related U.S. Application Data

(63) Continuation of application No. 13/838,819, filed on Mar. 15, 2013, now Pat. No. 9,154,773.

(51) Int. Cl.
| | |
|---|---|
| *G06K 9/00* | (2006.01) |
| *G06T 7/00* | (2006.01) |
| *H04N 13/02* | (2006.01) |
| *G06T 17/10* | (2006.01) |

(Continued)

(52) U.S. Cl.
CPC ......... *G06T 7/0046* (2013.01); *G06K 9/00214* (2013.01); *G06K 9/4671* (2013.01); *G06K 9/6211* (2013.01); *G06T 7/0075* (2013.01); *G06T 7/0081* (2013.01); *G06T 17/10* (2013.01); *H04N 13/025* (2013.01); *H04N 13/0239* (2013.01); *H04N 13/0275* (2013.01); *G06K 2209/19* (2013.01); *G06T 2207/10012* (2013.01); *G06T 2207/10028* (2013.01); *G06T 2207/20141* (2013.01); *G06T 2207/30108* (2013.01)

(58) Field of Classification Search
CPC ............................ G06T 7/0004; G06T 7/001
USPC ......................................................... 382/141
See application file for complete search history.

(56) References Cited

U.S. PATENT DOCUMENTS

| | | | | |
|---|---|---|---|---|
| 4,677,734 | A | * 7/1987 | Bloch | ........................ B25J 9/00 29/33 M |
| 7,480,596 | B2 | * 1/2009 | Hashima | ............. B60R 16/0207 703/1 |
| 2001/0020223 | A1 | * 9/2001 | Kodama | ............. B60R 16/0207 703/2 |

(Continued)

OTHER PUBLICATIONS

Jiang X, Koo K, Kikuchi K, Konno A, Uchiyama M. Robotized assembly of a wire harness in car production line. In: Proceedings of the 2010 IEEE/RSJ international conference on intelligent robots and systems; 2010. p. 490-5.*

(Continued)

*Primary Examiner* — Devona Faulk
*Assistant Examiner* — Jin Ge

(57) ABSTRACT

A robot is made to recognize and manipulate different types of cable harnesses in an assembly line. This is achieved by using a stereo camera system to define a 3D cloud of a given cable harness. Pose information of specific parts of the cable harness are determined from the 3D point cloud, and the cable harness is then re-presented as a collection of primitive geometric shapes of known dimensions, whose positions and orientations follow the spatial position of the represented cable harness. The robot can then manipulate the cable harness by using the simplified representation as a reference.

20 Claims, 25 Drawing Sheets

(51) Int. Cl.
G06K 9/46 (2006.01)
G06K 9/62 (2006.01)

(56) References Cited

U.S. PATENT DOCUMENTS

| | | | |
|---|---|---|---|
| 2003/0020715 | A1 | 1/2003 | Sakakura et al. |
| 2004/0131232 | A1 | 7/2004 | Meisner et al. |
| 2006/0235644 | A1 | 10/2006 | Sawai et al. |
| 2007/0088530 | A1 | 4/2007 | Erignac et al. |
| 2010/0296724 | A1 | 11/2010 | Chang et al. |
| 2012/0173207 | A1* | 7/2012 | Abe .............. G06F 17/5095 703/1 |
| 2013/0004060 | A1 | 1/2013 | Bell et al. |

OTHER PUBLICATIONS

Chiu, H., et al., "Class-Specific Grasping of 3D Objects from a Single 2D Image", IEEE/RSJ International conference on Intelligent Robots and Systems, pp. 579-585, Oct. 18-22, 2010.

Roberts, T., et al., "Human Tracking Using 3D Surface Colour Distributions", Image and Vision Computing, vol. 24, Issue 12, Dec. 1, 2006, pp. 1332-1342.

Xu, C., et al., "3D Pose Estimation for Planes", Computer Vision Workshops (ICCV Workshops), 2009 IEEE 12th International Conference on Sep. 27, 2009-Oct. 4, 2009.

Dambreville, S., et al., "Robust 3D Pose Estimation and Efficient 2D Region-Based Segmentation from a 3D Shape Prior", Computer Vision—ECCV 2008, Lecture Notes in Computer Science vol. 5303, pp. 169-182, Oct. 2008.

Barrois, B., et al., "Spatio-temporal 3D Pose Estimation of Objects in Stereo Images", Computer Vision Systems Lecture Notes in Computer Science vol. 5008, pp. 507-516 Proceedings of the 6th International Conference on Computer Vision Systems, ICVS, 2008.

Rublee, E., et al., "ORB: an efficient alternative to SIFT or SURF", IEEE International Conference on Computer Vision, ICCV, Nov. 6-13, 2011.

Zhang, A., et al., "A flexible new technique for camera calibration", IEEE Transactions on Pattern Analysis and Machine Intelligence, vol. 22, No. 11, pp. 1330-01334, 2000.

Fusiello, A., et al., "A compact algorithm for rectification of stereo pairs", Machine Vision and Applications, 12 (1):16-22, 2000.

Zhu, D., et al., (1991) "Pipe Routing = Path Planning (with many constraints)", In: IEEE International Conference on Robotics and Automation, pp. 1940-1947.

Shang, W., et al., "Computational Framework for Cable Layout Design in Complex Products", 2012 International Conference on Medical Physics and Biomedical Engineering, Physics Procedia 33 ( 2012) 1879-1885.

Sung, R C. W., et al., "Automated design process modelling and analysis using immersive virtual reality", Computer-Aided Design, 41, 2009, pp. 1082-1094.

Ng, F. M., et al., "Designing cable harness assemblies in virtual environments", Journal of Materials Processing Technology 2000; 107:37-43.

* cited by examiner

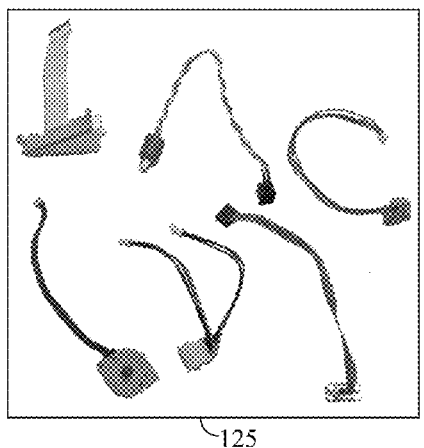 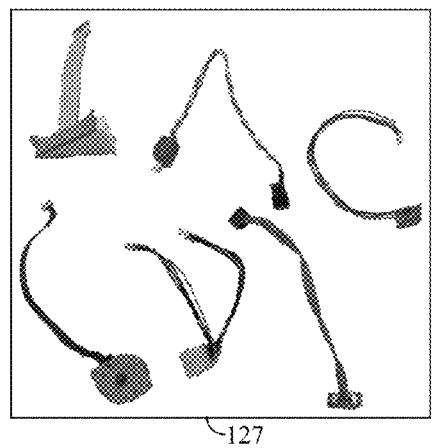
Fig. 20A
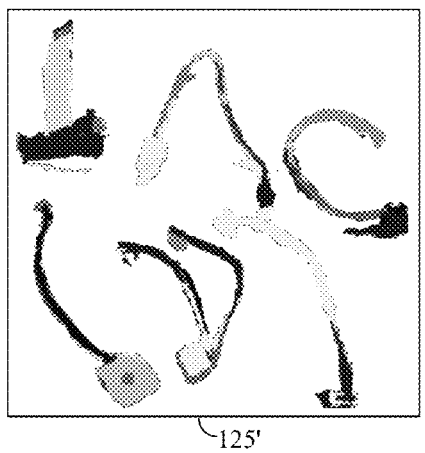 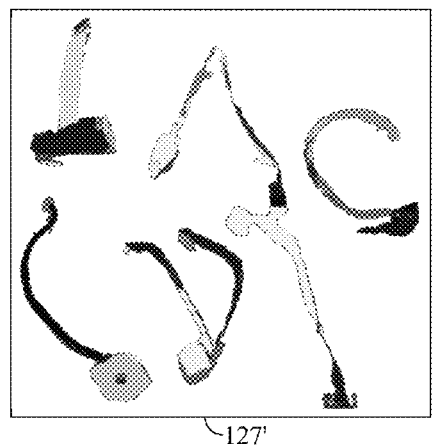
Fig. 20B
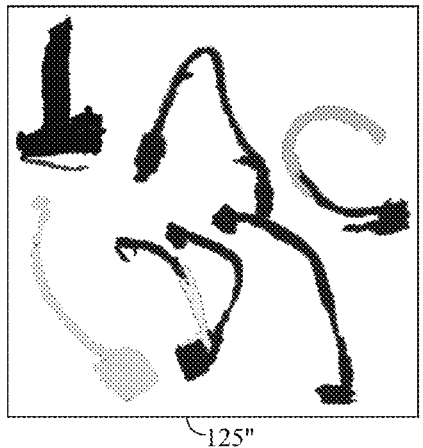 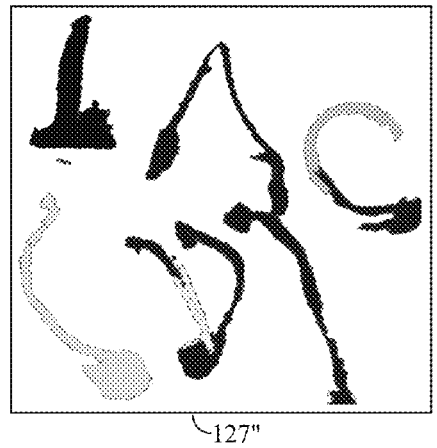
Fig. 20C

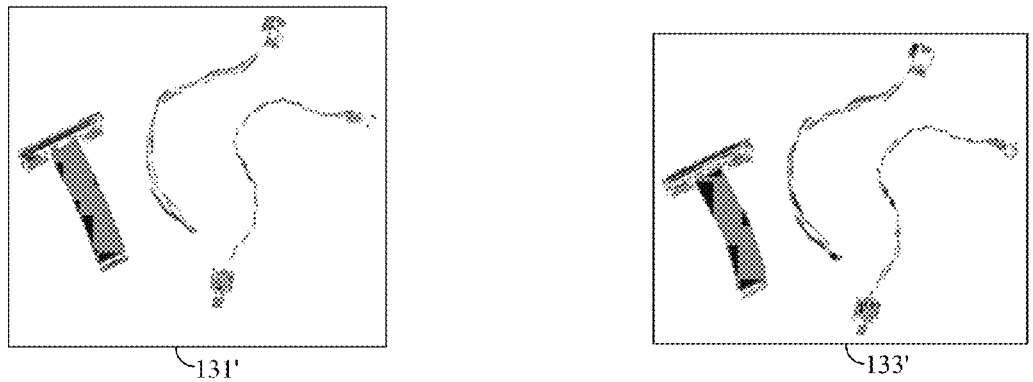

Fig. 21A

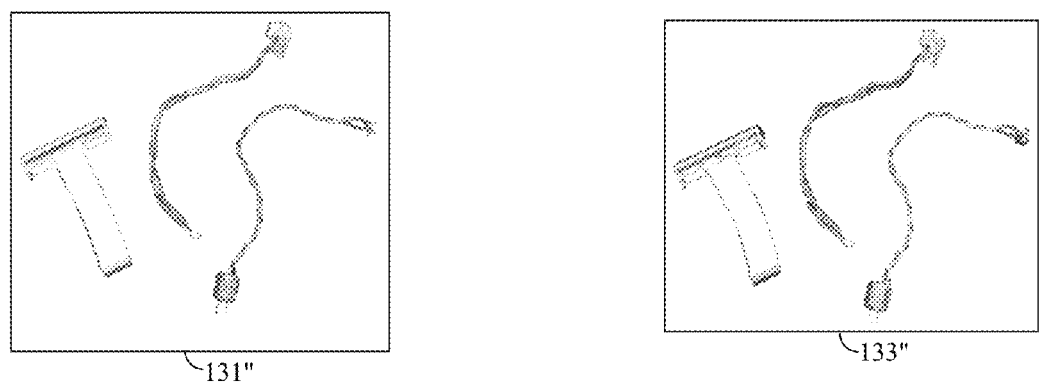

Fig. 21B

$$\begin{pmatrix} uw \\ vw \\ w \end{pmatrix} = \begin{pmatrix} P_1 \\ P_2 \\ P_3 \end{pmatrix} \begin{pmatrix} x \\ y \\ z \\ 1 \end{pmatrix} \text{ and } \begin{pmatrix} u'w' \\ v'w' \\ w' \end{pmatrix} = \begin{pmatrix} P_1' \\ P_2' \\ P_3' \end{pmatrix} \begin{pmatrix} x \\ y \\ z \\ 1 \end{pmatrix} \Longrightarrow \begin{pmatrix} uP_3 - P_1 \\ vP_2 - P_2 \\ u'P_3' - P_1' \\ vP_2' - P_2' \end{pmatrix} \begin{pmatrix} x \\ y \\ z \\ 1 \end{pmatrix} = 0$$

Fig. 23B

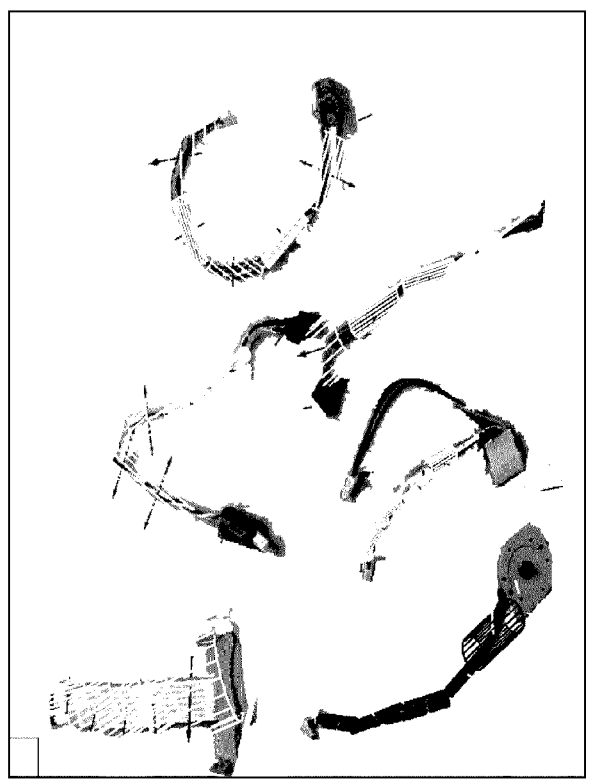
Fig. 29

- Cable units:
  - Number, positions, poses, and primitives
- Nodes:
  - Number and positions
- Connectors:
  - Number, positions, poses, and geometry

2D/3D LOCALIZATION AND POSE ESTIMATION OF HARNESS CABLES USING A CONFIGURABLE STRUCTURE REPRESENTATION FOR ROBOT OPERATIONS

CONTINUING APPLICATION DATA

This application is a continuation of, and claims priority under 35 U.S.C. §120 on, U.S. application Ser. No. 13/838,819, filed on Mar. 15, 2013, the content of which is incorporated herein in its entirety by reference.

BACKGROUND

1. Field of Invention

The present invention is generally directed to the field of robotic manipulation of objects. More specifically, it is directed towards robotic recognition and manipulation of cable harnesses.

2. Description of Related Art

In the field of automated, or robotic, manufacturing or assembly, the ability to identify assembly components, manipulate and attach them to other components is very important. Often, this is achieved by use of assembly stations, where each assembly station is limited to one component having one known orientation and requiring simplified manipulation.

It would be advantageous, however, for a machine to be able to select a needed component from a supply of multiple components, identify any key assembly features of the component, and manipulate the selected component as needed for assembly. This would require that the machine have some capacity for computer vision, object recognition and manipulation.

Before discussing some details of computer vision, however, it is beneficial to first discuss how computer vision has been used in the field of robotic (or machine) vision. Two important aspects of robotic vision are the identifying of an object and the estimating of its pose, i.e., its 3-dimensional (i.e., 3D) orientation relative to a known reference point and/or plane.

Since most cameras take 2-dimensional (i.e., 2D) images, many approaches attempt to identify objects in a 2D image and infer some 3D information from the 2D image. For example, in "Class-specific grasping of 3D objects from a single 2D image", by Chiu et al., *The 2010 IEEE/RSJ International Conference on Intelligent Robots and Systems*, October 18-22, 2010, Chiu et al. describe superimposing 2D panels in the form of simplified 2D shapes on the surface of objects in a 2D image. The 2D panels on each imaged object form a set defining the object in the 2D image. The generated 2D panels can then be compared with a library of panel sets that define different types of predefined 3D objects, such as a car. Each library panel set is compared from different view directions with the generated 2D panels of the imaged object in an effort to find a relatively close match. If a sufficiently match is found, then in addition to having identified the object, one has the added benefit of having a good guess as to its orientation given the matched orientation of the 2D panel set of the predefined 3D object in the library.

As a second example is found in "Human Tracking using 3D Surface Colour Distributions" by Roberts et al., *Image and Vision Computing*, 2006, by Roberts et al. In this example, Roberts et al describe a system where simplified 2D shapes are superimposed on known rigid parts human body (such as the head, torso, arms, etc) as shown in a 2D video image. The movements of the superimposed, simplified 2D shapes follow the movements of the moving human in the 2D video. By analyzing the movements of the 2D shapes, it is possible to discern the movement of the imaged human.

As is stated above, however, identifying a desired object in an image is only part of the solution, particularly when dealing with moving objects. In such cases, one further needs to discern information about the viewed object's pose, or orientation, and possible movement through space. Various approaches have been used to address this need.

For example, in "3D Pose Estimation for Planes", by Xu et al., *Computer Vision Workshops (ICCV Workshops)*, 2009 IEEE 12th International Conference on Sep. 27, 2009-Oct. 4, 2009. Xu et al. describe using a plane outline on the surface of a target object in a non-stereo image, and estimating the plane's normal direction to estimate the object's pose orientation.

A second example is found in "Robust 3D Pose Estimation and Efficient 2D Region-Based Segmentation from a 3D Shape Prior", by Dambreville et al., *European Conference on Computer Vision ICCV*, 2008. Dambreville et al. describe segmenting a rigid, known, target object in a 2D image, and estimating its 3D pose by fitting onto the segmented target object, the best fitting 2D projection of known 3D poses of the known target object.

A third example is provided in "Spatio-temporal 3D Pose Estimation of Objects in Stereo Images" by Barrois et al., *Proceedings of the 6th international conference on Computer vision systems*, ICVS'08. Barrois et al. describe using a 3D object's normal velocity (defined by the object's main direction of movement) at one point in time to estimate its pose at another point in time along a movement path.

Returning to the subject of computer vision, it is generally desirable that an image not only be captured, but that a computer be able to identify and label various features within the captured image. Basically, a goal of computer vision is for the computer to duplicate the abilities of human vision by electronically perceiving and understanding the contents of a captured image. This involves extracting symbolic information from image data using models constructed with the aid of geometry, physics, statistics, and learning theory. Thus, the field of computer vision includes methods for acquiring, processing, analyzing, and gleaning an understanding of imaged objects, in order to form decisions.

Various approaches to identifying features within a captured image are known in the industry. Many early approaches centered on the concept of identifying shapes. For example, if a goal was to identify a specific item, such as a wrench or a type of wrench, then a library of the different types of acceptable wrenches (i.e., examples of "true" wrenches) would be created. The outline shapes of the true wrenches would be stored, and a search for the acceptable shapes would be conducted on a captured image. Shapes within a captured image might be identified by means of a segmentation process where the outline of foreground objects is differentiated from an image's background. This approach of shape searching was successful when one had an exhaustive library of acceptable shapes, the library was not overly large, the subject of the captured images did not deviate from the predefined true shapes, and the background surrounding the target object was not overly complicated.

For complex searches, however, this approach is not effective. The limitations of this approach become readily apparent when the subject being sought within an image is not static, but is prone to change. For example, a human face has definite characteristics, and its distortion is limited, but it still does not have an easily definable number of shapes and/or appearance it may adopt. It is to be understood that the term appearance is herein used to refer to color and/or light differences across an object, as well as other surface/texture variances. Other objects may be prone to far deformation than a human face. For example, cable harnesses have definite characteristics, but may take many different shapes and arrangements due to their wiring lacking many, if any, rigid structure. Nonetheless, it is still helpful to look at some of the computer vision approaches used in face recognition, as some aspects in this field can be applied to computer vision, in general.

Although an exhaustive library of samples of a known rigid body may be compiled for identification purposes, it is self-evident that compiling an exhaustive library of human faces, or any non-rigid or amorphous object, and their many variations is a practical impossibility. Thus, statistical methods have been developed to address these difficulties.

Developments in image recognition of objects that change their shape and appearance, are discussed in "Statistical Models of Appearance for Computer Vision", by T. F. Cootes and C. J. Taylor (hereinafter Cootes et al.), Imaging Science and Biomedical Engineering, University of Manchester, Manchester M13 9PT, U.K. email: t.cootes@man.ac.uk, http://www.isbe.man.ac.uk, Mar. 8, 2004, which is hereby incorporated in its entirety by reference.

As Cootes et al., explain, in order for a machine to be able to understand what it "sees", it must make use of models that describe and label the expected structure being imaged. In the past, model-based vision has been applied successfully to images of man-made, rigid objects having limited and known variations. Model-based vision, however, has proven more difficult in interpreting images of non-rigid object having unknown variations, such as images of natural subjects, which tend to be complex and variable. A problem is the variability of the subject being examined. To be useful, a model needs to be specific, that is, it should be limited to representing true examples of the modeled subject. The model, however, also needs to be general and flexible enough to represent other plausible example (i.e., other possible true example not specifically available in a sample library) of the class of object it represents. It has been shown that this apparent contradiction can be handled by statistical models that can capture specific patterns of variability in shape and appearance. It has further been shown that these statistical models can be used directly in image interpretation.

To facilitate the application of statistical models, subjects to be interpreted are typically separated into classes (i.e., category of objects). This permits the statistical analysis to use prior knowledge of the characteristics of a particular class of object to facilitate its identification and labeling, and even to overcome confusion caused by structural complexity, noise, or missing data.

Additionally, in order to facilitate further processing of identified and labeled subjects within a captured image, it is beneficial for the identified subject to be transformed into (i.e., be fitted onto) a predefined, "model" shape with predefined locations for labeled items. For example, although the human face may take many shapes and sizes, it can be conformed to a standard shape and size. Once conformed to the standard shape and size, the transformed face can then be further processed to determine its expression, determine its gaze direction, identify the individual to whom the face belongs, etc.

A method that uses this type of alignment is the active shape model. With reference to FIG. 1, the active shape model uses a predefined model of a class of object, such as human face 1A in the present example, and a list of predefined deformation parameters, each having corresponding deformation constraints, to permit the predefined model to be stretched and move to attempt to align it with a subject image 2. Alternatively, the list of predefined deformation parameters may be applied to subject image 2, and have it be moved and deformed to attempt to align it with the predefined model 1A. This alternate approach has the added benefit that once subject image 2 has been aligned with the predefined model 1A, it will also be fitted to the shape and size of the predefined model 1A, which facilitates the identifying of individual parts of the subject image 2 in accordance with labels on the predefined model 1A.

For illustrative purposes, FIG. 1 shows predefined model (i.e., model face) 1A being fitted to subject image (i.e., subject face) 2. The example of FIG. 1 is an exaggerated case for illustration purposes. It is to be understood that a typical model face 1A would have constraints regarding its permissible deformation points relative to other points within itself. For example, if aligning the model face meant moving its left eye up one inch and moving its right eye down one inch, then the resultant aligned image would likely not be a human face, and thus such a deformation would typically not be permissible. It is to be understood, however, that this limitation would not apply to non-rigid object that can take large amounts of deformation, such as cable harnesses.

In the example of FIG. 1, the model face 1A is first placed roughly within the proximity of predefined points of interest, and typically placed near the center of subject face 2, as illustrated in image 3. By comparing the amount of misalignment resulting from moving model face 1A in one direction or another, and the results of adjusting a size multiplier in any of several predefined directions, one can determine how to better align model face 1, as illustrated in image 4. An objective would be to align as closely as possible predefined landmarks, such as the pupils, nostril, mouth corners, etc., as illustrated in image 5. Eventually, after a sufficient number of such landmark points have been aligned, the subject image 2 is warped onto model image 1A resulting in a fitted image 6 with easily identifiable and labeled features of interest that can be further processed to achieve specific objectives.

This approach, however, does not take into account changes in appearance, i.e., shadow, color, or texture variations for example. A more holistic, or global, approach that jointly considers the object's shape and appearance is the Active Appearance Model (AAM). Although Cootes et al. appear to focus primarily on the gray-level (or shade) feature of appearance, they do describe a basic principle that AAM searches for the best alignment of a model face (including both model shape parameters and model appearance parameters) onto a subject face while simultaneously minimizing misalignments in shape and appearance. In other words, AAM applies knowledge of the expected shapes of structures, their spatial relationships, and their gray-level appearance (or more generally color value appearance, such as RGB values) to restrict an automated system to plausible interpretations. Ideally, AAM is able to generate realistic images of sought objects. An example would be a model face capable of generating convincing images of an individual, such as by changing the individual's expression and so on. AAM thus formulates interpretation as a matching problem: given an image to interpret, structures are located and labeled by adjusting the model's parameters in such a way that it generates an 'imagined image' that is as similar as possible to the real thing.

Although AAM is a useful approach, implementation of AAM still poses several challenges. As stated above, an AAM machine generates results from the application of statistical analysis of a library of true samples to define distinguishing parameters and the parameter's permissible distortions. By the nature of the statistical analysis, the results will permit alignment only with a fraction of all true samples. If the subject category is prone to a wide range of changes, such as cable harness that can take any distortion when dropped onto an assembly line (such as a conveyor belt) or when picked up, the model may not be able to properly align itself to an input subject image with characteristics beyond the norm defined by the shape or appearance model.

Another limitation of an AAM machine is that construction of the model (or conical) image (i.e., model face 1A in the example of FIG. 1) requires much human intervention to identify the distinguishing features of the specific object being sought.

For example with reference to FIG. 2, model face 1A may be constructed from a library of training images 1 (i.e., true face images). Typically, a user manually places "landmark" points on each training image to outline specific features characteristic to the class of object being represented. The landmark points are ideally selected in such a way that the landmark points outline distinguishable features within the class common to every training image. For instance, a common feature within a face class may be the eyes, and when building a model of the appearance of an eye in a face image, landmark points may be placed at the corners of the eye since these features would be easy to identify in each training image. In addition to the landmark points, however, an active appearance model (AAM) machine also makes use of appearance data (i.e., shade data and/or color data and/or texture data, etc.) at various patches of each training image to create a distribution range of acceptable appearances for corresponding patches within model face 1A. This appearance data constitutes additional features in the overall statistical analysis.

Thus, an AAM machine may be too complicated and computationally intensive for practical machine vision applications in industrial assembly lines where the object class is prone to great deformation, such as when the object class is one or more types of wire harnesses. Thus, machine vision applications typically rely on more automated methods of identifying characteristic features and object edges in a captured image. Additionally if a machine is expected to interact with an object in an assembly line, such as if a robot is intended to pick up a specific type of wire harness from a bin of multiple wire harnesses and attach (i.e., plug) a specific end of the harness to a specific receptacle, the machine will need some sort of depth perception to properly manipulate the robot.

It is further noted that edge detection algorithms are part of many image manipulation operations. Edge detection is fundamental to image processing and computer vision, particularly in the areas of feature detection and feature extraction. Edge detection aims to identify points, i.e., pixels that outline objects within an image. There are many edge detection algorithms, but generally they attempt to identify pixels at which discontinuities occurs, i.e., where the image brightness changes sharply. In the ideal case, the result of applying an edge detector to an image leads to a set of connected curves that indicate the boundaries of objects, the boundaries of surface markings, and discontinuities in surface orientation. Once the boundaries have been identified, various image processing operations may be applied to the digital image.

For example FIG. 3A shows a typical digital image, and FIG. 3B shows the results of applying edge detection to the image of FIG. 3A. Edge detection may be designed to identify thick or thin lines, or may be optimized to separately identify thick and thin lines. In the example of FIG. 3B, both thick and thin lines are separately identified, which permits them to be separately processed. This permits the processing of the digital image to be more specialized by adjusting the size of a pixel-processing window according to line thickness. As a result, application of a specific image processing algorithms, such a bilateral filter, may be optimized along the edge of objects according to line thickness to achieve a sharper final image, as shown in FIG. 3C.

Another use of edge detection is feature detection. As an example, if one has a library of identifying features of a specific object, then one may search an input digital image for those identifying features in an effort to determine if an example of the specific object is present in the input digital image. When this is extended to multiple digital images of a common scene taken from different view angles, it is possible to index, i.e., match or correlate, feature points from one image to the other. This permits the combined processing of the multiple digital images.

For example in FIG. 4, images 7A, 7B, 7C and 7D each provide partial, and overlapping, views of a building in a real-world scene, but none provide a full view of the entire building. However, by applying edge detection and indexing (i.e., identifying matching pairs of) feature points in the four partial images 7A, 7B, 7C and 7D that correlate to the same real feature point in the real-world scene, it is possible to stitch together the four partial images (i.e., applying an image stitching tool) to create one composite image 7E of the entire building. The four partial images 7A, 7B, 7C and 7D of FIG. 4 are taken from the same view angle, but this approach may be extended to the field of correspondence matching, where images of a common scene are taken from different view angles.

Images of a common scene are taken from different view angles are the basis for stereo vision and depth perception. In this case, corresponding feature points in two images taken from different view angles (and/or different fields of vision) of the same subject (or scene) can be combined to create a perspective view of the scene. Thus, imaging a scene from two different view points (i.e., from two different fields of vision, FOV) creates stereo vision, which provides depth information about objects in the scene.

This ability would be particularly helpful in the field of robotics and automated assembly/construction. In these applications, a machine having stereo vision and the ability to discern (i.e., identify) target items would have the ability to independently retrieve the target item and use it in an assembly.

Implementing such vision capabilities, however, is still a challenge, even in a specialized assembly line where the number of possible target object variants is limited. The challenges become even more daunting when the target objects are amorphous, or otherwise prone to change in shape and/or appearance, such as in the case of wire harnesses.

It is an object of the present invention to provide a system for identifying and manipulating cable harnesses for use in robotic assembly lines.

It is a further object of the present invention to make use of 3D information for determining pose information of cable harnesses.

It is a further object of the present invention to provide a 3D visual system suitable for use in a robotic assembly line.

SUMMARY OF INVENTION

The above objects are met in a cable harness visualization system using stereo imaging to view cable harnesses, determine their pose, and identify specific segments (and/or parts) of the viewed cable harness for manipulation.

A 2D cable localization module identifies pairs of commonly imaged cables in a pair of stereo images. A 3D cable localization module then creates a 3D point cloud of the identified pairs of commonly imaged cables. Alternatively, a 3D imaging system may create a 3D model of an image harness, which includes construction of a 3D point cloud representation of the physical cable harness. The 3D imaging system may be include, for example, a 3D laser scanner, a KINECT sensor (such as produced by MICROSOFT Corp.), and/or a time-of-flight device or similar device, such as a range camera. Irrespective of how the 3D point cloud is constructed, normal directions are determined for points within the 3D point cloud to determine the image cable's pose.

A cable structure representation module then redefines the complex, 3D point clouds in terms of simplified, predefined, 3D primitive shapes. The shapes may be cylinders or parallel prisms for the non-rigid parts (i.e., the wires) of a cable harness. Cable connectors may also be defined by 3D geometric primitive shapes, or they may be defined be 3D primitive shapes determined from CAD (computer-aided design) files that define the connector. Each non-rigid cable segment is defined by trains of 3D primitive shapes of known (and stored) length(s). The lengths may be determined on-the-fly on a case-by-case basis, or may be predetermined. In this manner, a particular point on the non-rigid cable segment may be determined by counting the number of primitive shapes needed to reach the particular point along the cable harness.

The above objects are further met in a cable harness visualization system, comprising: a three-dimensional, i.e., 3D, imaging system imaging at least one physical cable harness and creating a 3D cable harness model of the imaged physical cable harness; a cable structure representation module representing the 3D cable harness model in terms of sets of predefined primitive 3D shapes and node markers, each primitive 3D geometric shape being of known dimensions, the imaged physical cable harness having connectors and non-rigid cable segments, the node markers defining the opposing ends of the non-rigid cable segments, each non-rigid cable segment being joined to a connector or to another non-rigid cable segment at a node marker; wherein: each non-rigid cable segment is represented by a corresponding one of the sets of predefined primitive 3D shapes; the corresponding set of predefined primitive 3D shapes consisting of a train of primitive 3D geometric shapes that spatially track the path of its corresponding non-rigid cable segment, each non-rigid cable segment extends into the interior of its corresponding train of geometric shapes, and the individual geometric shapes within a train of geometric shapes turn in accord with twists and turns of the non-rigid cable segment they represent.

Preferably, in the cable structure representation module, IF a non-rigid cable segment consists of a plurality of wires substantially coupled linearly side-by-side each other to a connector, THEN its corresponding train of primitive 3D geometric shapes consists of a train of rectangular prisms; ELSE its corresponding train of primitive 3D geometric shapes consists of a train of cylinders.

Additionally, the widths of the rectangular prisms may substantially span across the side-by-side wires they represent, and the diameters of the cylinders substantially encompass the portion of the non-rigid cable segment they represent.

Furthermore, all rectangular prisms within the train of rectangular prisms may have a common first length, and all cylinders within train of cylinders may have a common second length.

If desired, each non-rigid cable segment may is characterized by a lack of joints or rigid portions between its opposing ends.

Additionally, the 3D imaging system may include at least one of a time-of-flight device, a 3D laser scanner, a KINECT sensor, and a range camera.

Preferably, the 3D cable harness model is based on a point cloud.

Further preferably, the 3D imaging system includes: a stereo imaging device producing stereoscopic image pairs of the physical cable harnesses, each stereoscopic image pair including a first image and a second image; a two-dimensional, i.e., 2D, cable localization module localizing commonly imaged physical cable harnesses in the first and second images, the 2D cable localization module further identifying corresponding pixel pairs in the first and second images, each corresponding pixel pair including a first pixel from the first image and a second pixel from the second image, both first and second pixels corresponding to a commonly imaged point on a commonly imaged physical cable harness; a 3D cable localization module creating a 3D point cloud representation of each commonly imaged physical cable harness in 3D space in accordance with perspective constraints and the commonly imaged physical cable harness' corresponding pixel pairs; a 3D pose estimator determining cable pose orientations of commonly imaged physical cable harnesses in the 3D space in accordance with their corresponding 3D point clouds, the 3D pose estimator determining a surface normal direction for selected points within the 3D point clouds relative to a neighborhood-of-points of predefined size surrounding each selected point, the 3D cable harness model being defined by a corresponding 3D point cloud and corresponding cable pose orientations.

In this case, the 3D pose estimator determines the surface normal direction for all points within all 3D point clouds.

Additionally, the 2D cable localization module segments the first and second image to define image segments, and each image segment defines a silhouette of an imaged cable harness.

Following this approach, it is preferred that each image segment be defined by: (I) for each unsegmented part of an image, selecting a seed point within the unselected part, and for each selected point iteratively applying the following steps: (i) determine similarity measures for the color similarities between the seed point and its nearest neighbor pixels, the nearest neighbor pixels being candidate pixels; (ii) join the seed point and the candidate pixels if the similarity measures are higher than a predefined threshold, and IF any of the joined pixels are a part of an existing image segment, THEN the existing image segment is grown to include the joined pixels, ELSE the joined pixels define a new image segment; (iii) determine a region color distribution for the image segment of step (ii) and calculate its principle component; (II) returning to step (I) until all points within an image have been selected, in turn.

Further preferably, the system includes after step (II): step (III) of joining together any proximate image segments having a region color distribution similarity within a predefined first threshold and a geometric properties similarity within a predefined second threshold.

In this case, proximate image segments may be defined as image segments separated by not more than 60 pixels.

It is further preferred that the region color distribution similarity and the geometric properties similarity between image segments be determined from their respective principle components, within predefined thresholds.

The preferred system further includes including after step (II): (a) determining a first set of feature descriptors for the image segments in the first image and a second set of feature descriptors for image segments in the second image; and (b) defining the corresponding pixel pairs by matching pairs of corresponding feature descriptors between the first and second sets of feature descriptors.

In this case, it is preferred that step (b) further include: identifying as a candidate matching descriptor, a feature descriptor in the second set that matches a given feature descriptor in the first set; and IF its relative position within the second image differs from the relative position of the given feature descriptor in the first image by more than a predefined margin, THEN discarding the candidate matching descriptor, ELSE deeming the candidate matching descriptor as a corresponding pixel pair to the given feature descriptor.

It is also preferred that step (b) feature descriptors in the first and second sets of feature descriptors be matched by means of a tree-based feature matching scheme.

It further envisioned that the 3D pose estimator implement the following steps: (a) applying global homography to the first and second images to reject corresponding pixel pairs in the first and second images that do not satisfy global homography constraints; and (b) for each corresponding pixel pair not rejected in step (a), applying local homography in accordance to its corresponding image segments to further remove from each image segment any points that meeting local homography constraints.

Additionally in the cable harness visualization system, the 3D pose estimator may determine a surface normal direction for a selected point by; defining a local window around the selected point; identifying the 3D points within the defined local window; fitting a 2D plane on to the identified 3D points, and estimating the local 3D normal direction of the fitted 2D plane.

The above objects are further met in a robotic system for manipulating cable harnesses, where the robotic system implements any of the cable harness visualization system described above.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

FIGS. 20A, 20B and 20C illustrate various processing steps of 2D localization block 107.

FIGS. 21A and 21B are a second example of the processing of 2D localization block 107.

FIGS. 23A and 23B illustrate a triangulation operation as implemented by stereo matching block 109 of FIG. 17.

FIG. 29 illustrates a sequence of estimated 3D cable primitives (cylinders) using the 3D cable point clouds and surface normals (two views).

DESCRIPTION OF THE PREFERRED EMBODIMENTS

Figure 1:
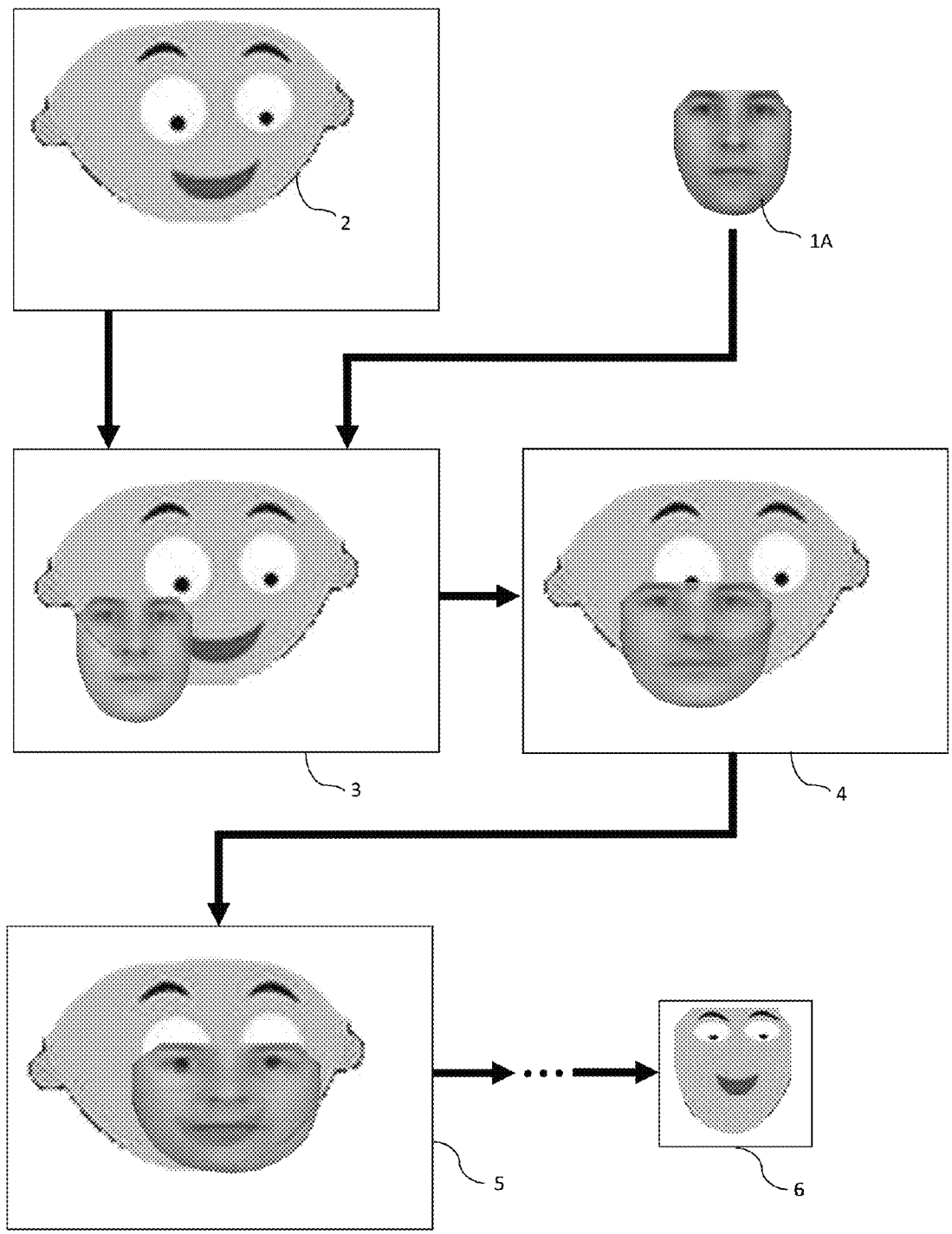
FIG. 1 illustrates the fitting of an object within an image to a model shape of that object class.
Figure 2:
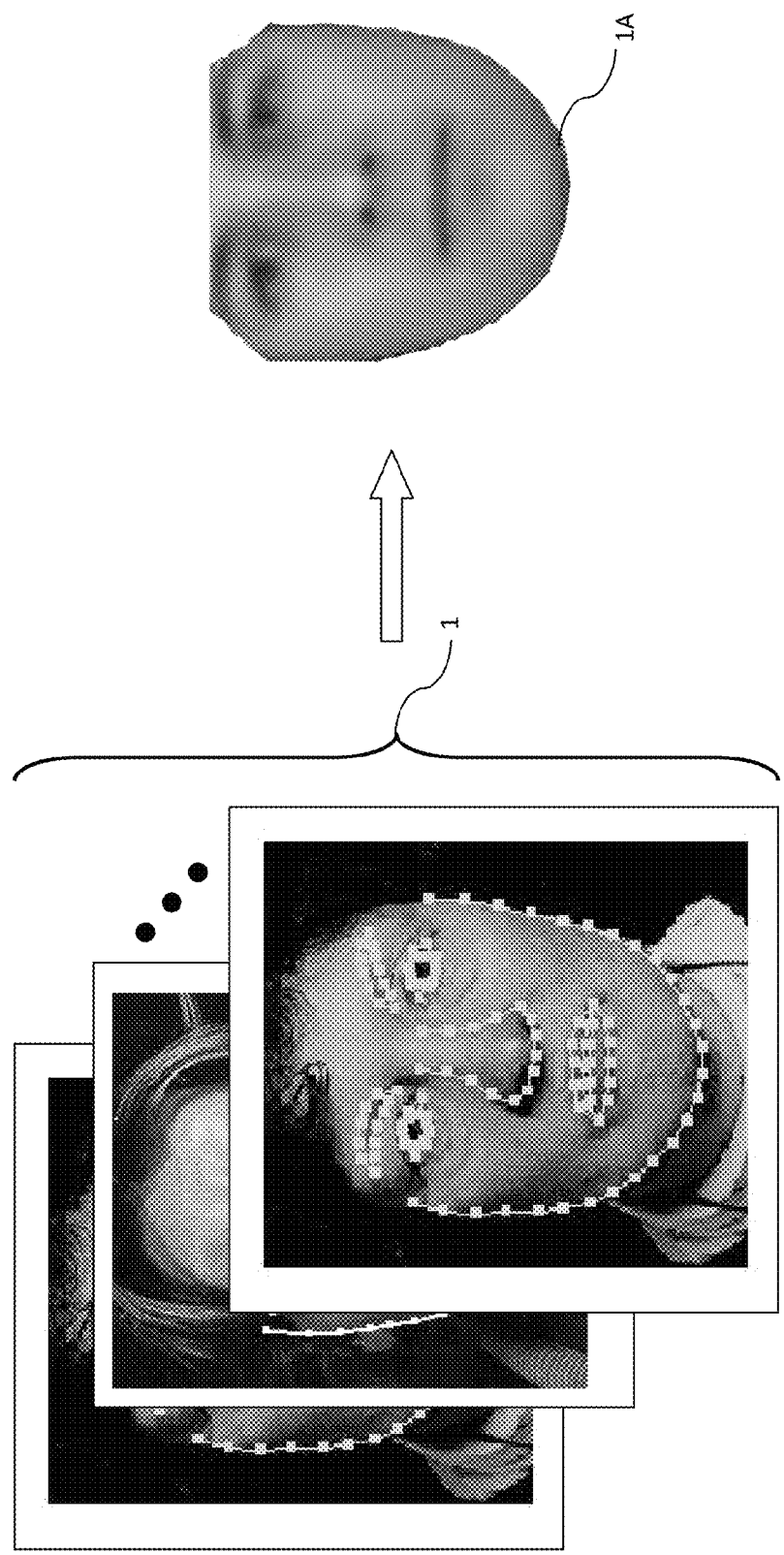
FIG. 2 illustrates the defining of a model shape of a specific object class, i.e., a human face, by combining characteristic of a collection of training images and provided "landmark" points.
Figure 3A:
FIGS. 3A, 3B, and 3C illustrate the use of edge detection for the purposes of selecting filter types for specific parts of an image to improve image clarity.
Figure 3B:
Figure 3C:

Automated assembly of components is critical to the manufacture of many items. Often, automated assembly is limited to relatively rigid components, or sub-components to facilitate the manipulation of the components. There is a need, however, for a robotic assembly to be able to manipulate non-rigid bodies. In particular, it would be beneficial for an automated system to be able to manipulate cable harness, which have a non-rigid structure and are prone to take many different configurations. It is further beneficial for such an automated system to be able to distinguish between different cable harnesses in a collection, and to be further able to identify specific parts of the cable harness. There is a further need for such an assembly to be able to discern the pose, i.e., orientation or arrangement, of cable harnesses in order identify specific connectors on the cable harnesses, and properly align a connector to a specific receptacle of the connector.

It is presently preferred that such an automated system be able to receive 3-dimensional (3D), i.e., perspective, images, which provide depth information about a scene, such as an assembly line, and extract pose information about an imaged cable harness from the 3D image.

The 3D images may be produced by means of a 3D imaging system, such as a 3D laser scanner, a MICROSOFT CORP. KINECT sensor, a range camera, or any of many different types of time-of-flight devices. Preferably, however, the 3D images are produced using a stereo imaging system, which extracts 3D information from a pair of stereoscopic images (i.e., a stereoscopic image pair). As it is known in the art, each respective image in a stereoscopic image pair is produced by a respective one of two 2D imaging cameras spaced apart to provide two views of a common scene.

Irrespective of the 3D imaging technique used, it is desirable that the 3D imaging technique produce a point cloud of the imaged 3D object. As it is known in the art, a point cloud is a collection of points spread along the surface of a 3D object.

Before proceeding with a discussion of how to determine pose information from a 3D image (or 3D image model of a cable harness), it is beneficial to first provide general discussion of how 3D information (i.e., perspective information) may be extracted from a stereoscopic image pair.

In order to extract 3D information from a stereoscopic image pair, one first needs to be able to identify commonly imaged items in the stereoscopic image pair. However, since both images of the stereoscopic image pair provide different views of the commonly image items, this can be a difficult task. One needs to recognize different views of the same object in 2D images, and to correlate specific parts of the commonly imaged object.

Object recognition (or object identification) is an integral part of computer vision, and an integral part of object recognition is pattern matching. An essential component of pattern matching in images (and particularly in 2D images) is feature detection, which refers to identifying parts of an image, or individual feature points of an image (such as individual pixels), that are good candidates for investigation to determine if they might be part of a sought after object in an image.

Various techniques are known for identifying feature points, or individual pixels, in an image that may be used to describe an imaged scene. As an example, if one has a library of identifying feature points obtained from a library of training images, then one may search an input digital (test) image for those identifying features in an effort to determine if an example of the specific object is present in the input digital image. In the field of computer vision, this idea has been extended to matching common features of a common scene in multiple digital images of the common scene taken from different view angles to index, i.e., match or correlate, feature points from one image to the other. This permits the combined processing of the multiple digital images.

Figure 4:
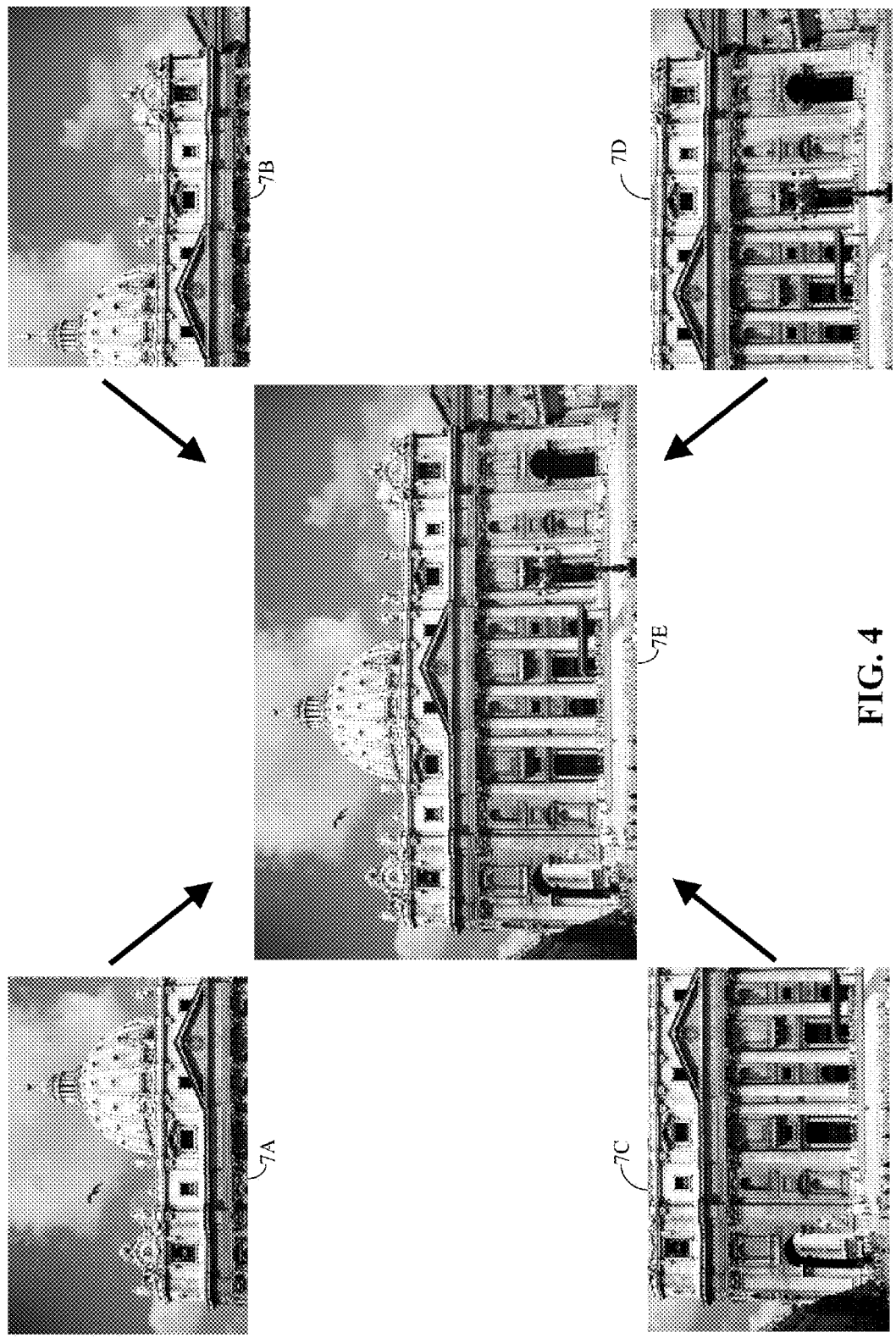
FIG. 4 illustrates the use of corresponding feature points in different images to stitch together the image to create a larger composite image.

For example in FIG. 4, images 7A, 7B, 7C and 7D each provide partial, and overlapping, views of a building in a real-world scene, but none provide a full view of the entire building. However, by applying edge detection and indexing (i.e., identifying matching pairs of) feature points in the four partial images 7A, 7B, 7C and 7D that correlate to the same real feature point in the real-world scene, it is possible to stitch together the four partial images (i.e., applying an image stitching tool) to create one composite image 7E of the entire building. The four partial images 7A, 7B, 7C and 7D of FIG. 4 are taken from the same view angle, but this approach may be extended to the field of correspondence matching.

Correspondence matching refers to the matching of objects or object features (or more typically, the matching of feature points, i.e., individual pixels) common to two or more images. Correspondence matching tries to figure out which parts of a first image correspond to (i.e., are matched to) which parts of a second image, assuming that the second image was taken after the camera that took the first image had moved, time had elapsed, and/or the pictured objects had moved. For example, the first image may be of a real-world scene taken from a first view angle with a first field-of-vision, FOV, and the second image may be of the same scene taken from a second view angle with a second FOV. Assuming that the first and second FOVs at least partially overlap, correspondence matching refers to the matching of common features points in the overlapped portions of the first and second images.

Thus, correspondence matching is an essential problem in computer vision, especially in stereo vision, view synthesis, and 3D (or perspective) reconstruction. Assuming that a number of image features, or objects, in two images taken from two view angles have been matched, epipolar geometry may then be used to identify the positional relationship between the matched image features to achieve stereo view synthesis, or 3D reconstruction.

Epipolar geometry is basically the geometry of stereo vision. For example in FIG. 5, two cameras 11 and 13 create two 2D images 15 and 17, respectively, of a common 3D scene 10 consisting of a larger sphere 19 and a smaller sphere 21. 2D images 15 and 17 are taken from two distinct view angles 23 and 25. Epipolar geometry describes the geometric relations between points in 3D scene 10 (for example spheres 19 and 21) and their relative projections in 2D images 15 and 17. These geometric relationships lead to constraints between the image points, which are the basis for epipolar constraints, or stereo constraints, described more fully below.

Figure 5:
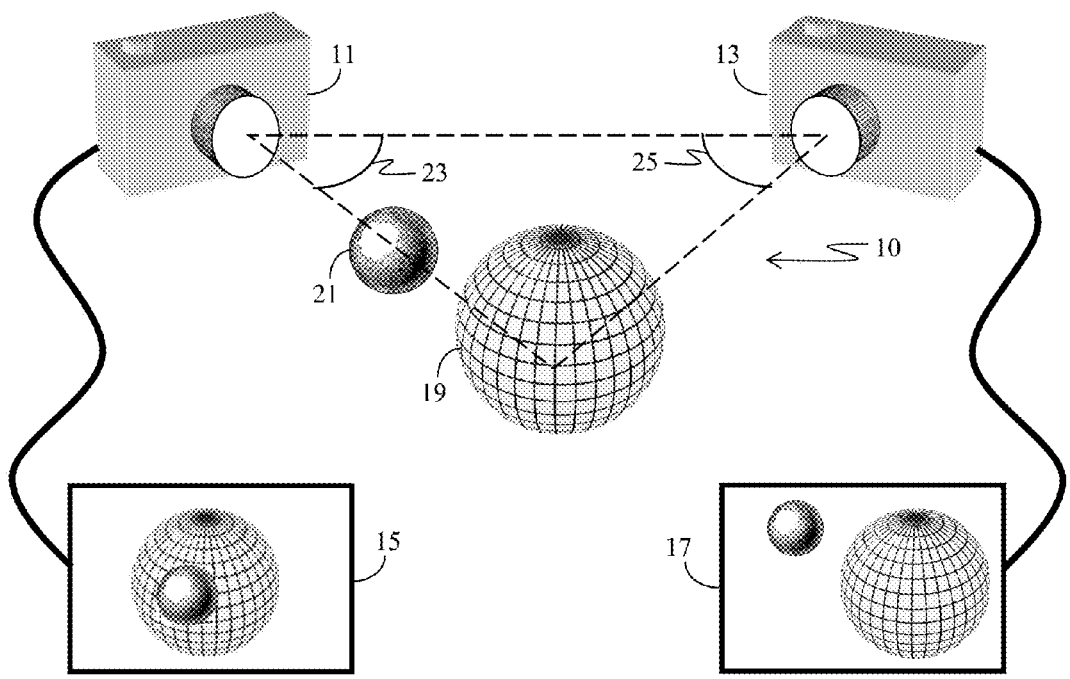
FIG. 5 illustrates the principles of Epipolar geometry.

FIG. 5 illustrates a horizontal parallax where, from the view point of camera 11, smaller sphere 21 appears to be in front of larger sphere 19 (as shown in 2D image 15), but from the view point of camera 13, smaller sphere 21 appears to be some distance to the side of larger sphere 19 (as shown in 2D image 17). Nonetheless, since both 2D images 15 and 17 are of the same 3D scene 10, both are truthful representations of the relative positions of larger sphere 19 and smaller sphere 21. The positional relationships between camera 11, camera 13, smaller sphere 21 and larger sphere 19 thus establish geometric constraints on 2D images 15 and 17 that permit one to reconstruct 3D scene 10 given only 2D images 15 and 17, as long as the epipolar constraints (i.e., stereo constraints) are known.

Figure 6:
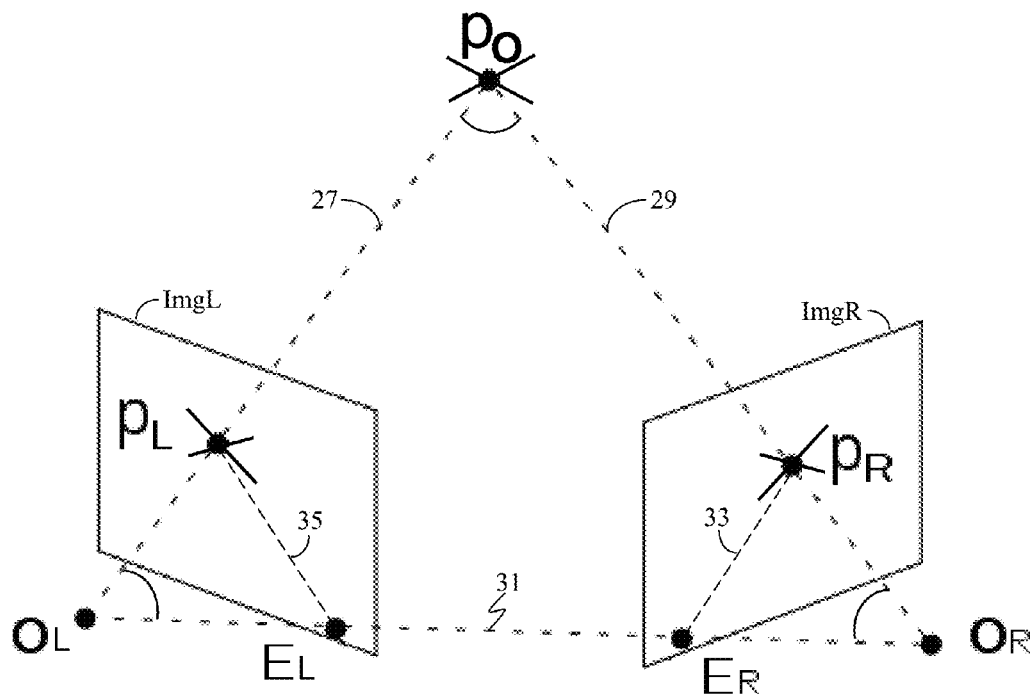
FIG. 6 is an example of defining stereo constraints using Epipolar geometry.

Epipolar geometry is based on the pinhole camera model, a simplified representation of which is shown in FIG. 6. In the pinhole camera model, cameras are represented by a point, such as left point $O_L$ and right point $O_R$, at each respective camera's focal point. Point $P_O$ represents the point of interest (i.e., an object) in the 3D scene being imaged, which in the present example is represented by two crisscrossed lines.

Typically, the image plane (i.e., the plane on which a 2D representation of the imaged 3D scene is captured) is behind a camera's focal point and is inverted. For ease of explanation, and to avoid the complications of a an inverted captured image, two virtual image planes, ImgL and ImgR, are shown in front of their respective focal points, $O_L$ and $O_R$, to illustrate non-inverted representations of captured images. One may think of these virtual image planes as windows through which the 3D scene is being viewed. Point $P_L$ is the 2D projection of point $P_O$ onto left virtual image ImgL, and point $P_R$ is the 2D projection of point $P_O$ onto right virtual image ImgR. This conversion from 3D to 2D may be termed a perspective projection, or image projection, and is described by the pinhole camera model, as it is known in the art. It is common to model this projection operation by rays that emanate from a camera and pass through its focal point. Each modeled emanating ray would correspond to a single point in the captured image. In the present example, these emanating rays are indicated by dotted lines 27 and 29.

Epipolar geometry also defines the constraints relating the positions of each camera relative to each other. This may be done by means of the relative positions of focal points $O_L$ and $O_R$. The focal point of a first camera would project onto a distinct point on the image plane of a second camera, and vise-versa. In the present example, focal point $O_R$ projects onto image point $E_L$ on virtual image plane ImgL, and focal point $O_L$ projects onto image point $E_R$ on virtual image plane ImgR. Image points $E_L$ and $E_R$ are termed epipoles, or epipole points. The epipoles and the focal points they project from lie on a single line, i.e., line 31.

Line 27, from focal $O_L$ to point $P_O$, is seen as a single point $P_L$ in virtual image plane ImgL, because point $P_O$ is directly in front of focal point $O_L$. This is similar to how in image 15 of FIG. 5; smaller sphere 21 appears to be in front of larger sphere 19. However, from focal point $O_R$, the same line 27 from $O_L$ to point $P_O$ is seen a displacement line 33 from image point $E_R$ to point $P_R$. This is similar to how in image 17 of FIG. 5; smaller sphere 21 appears to be displaced to the side of larger sphere 19. This displacement line 33 may be termed an epipolar line. Conversely from focal point $O_R$, line 29 is seen as a single point $P_R$ in virtual image plane ImgR, but from focal point $O_L$ line 29 is seen as displacement line, or epipolar line, 35 on virtual image plane ImgL.

Epipolar geometry thus forms the basis for triangulation. For example, assuming that the relative translation and rotation of cameras $O_R$ and $O_L$ are known, if projection point $P_L$ on left virtual image plane ImgL is known, then the epipolar line 33 on the right virtual image plane ImgR is known by epipolar geometry. Furthermore, point $P_O$ must projects onto the right virtual image plane ImgR at a point $P_R$ that lies on this specific epipolar line, 33. Essentially, for each point observed in one image plane, the same point must be observed in another image plane on a known epipolar line. This provides an epipolar constraint that corresponding image points on different image planes must satisfy.

Another epipolar constraint may be defined as follows. If projection points $P_L$ and $P_R$ are known, their corresponding projection lines 27 and 29 are also known. Furthermore, if projection points $P_L$ and $P_R$ correspond to the same 3D point $P_O$, then their projection lines 27 and 29 must intersect precisely at 3D point $P_O$. This means that the three dimensional position of 3D point $P_O$ can be calculated from the 2D coordinates of the two projection points $P_L$ and $P_R$. This process is called triangulation.

Figure 7:
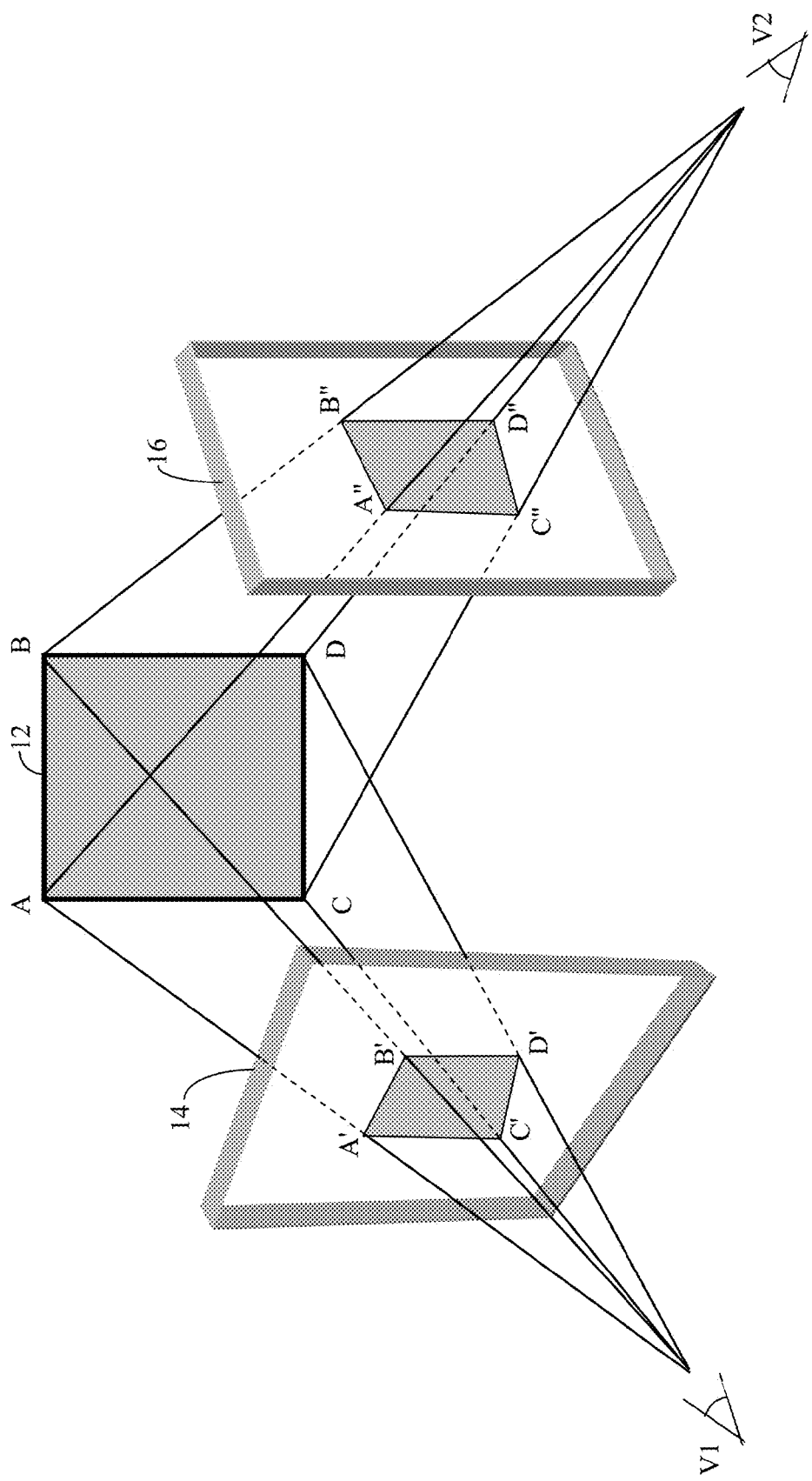
FIG. 7 illustrates the establishment of homography constraints from stereo constraints.

Epipolar geometry also forms the basis for homography, i.e., projective transformation. Homography describes what happens to the perceived positions of observed objects when the point of view of the observer changes. An example of this is illustrated in FIG. 7, where the shape of a square 12 is shown distorted in two image projections 14 and 16 as viewed from two different points of view V1 and V2, respectively. Like before, image planes 14 and 16 may be thought of as windows through which the square 12 is viewed.

Homography would identify the points in common between image projections 14 and 16 and square 12 (i.e., point registration). For example, the four corners A, B, C and D of square 12 correspond to points A', B', C' and D' in image projection 14, and correspond to points A", B", C" and D" in image projection 16. Thus, points A', B', C' and D' in image projection 14 correspond respectively to points A", B", C" and D" in image projection 16.

Assuming that the pinhole model applies, epipolar geometry permits homography to relate any two images of the same planar surface in space, which permits image rectification, image registration, or computation of camera motion (rotation and translation) between two images. Once camera rotation and translation have been extracted from an estimated homography matrix, this information may be used for navigation, or to insert models of 3D objects into an image or video, so that they are rendered with the correct perspective and appear to have been part of the original scene.

Figure 8:
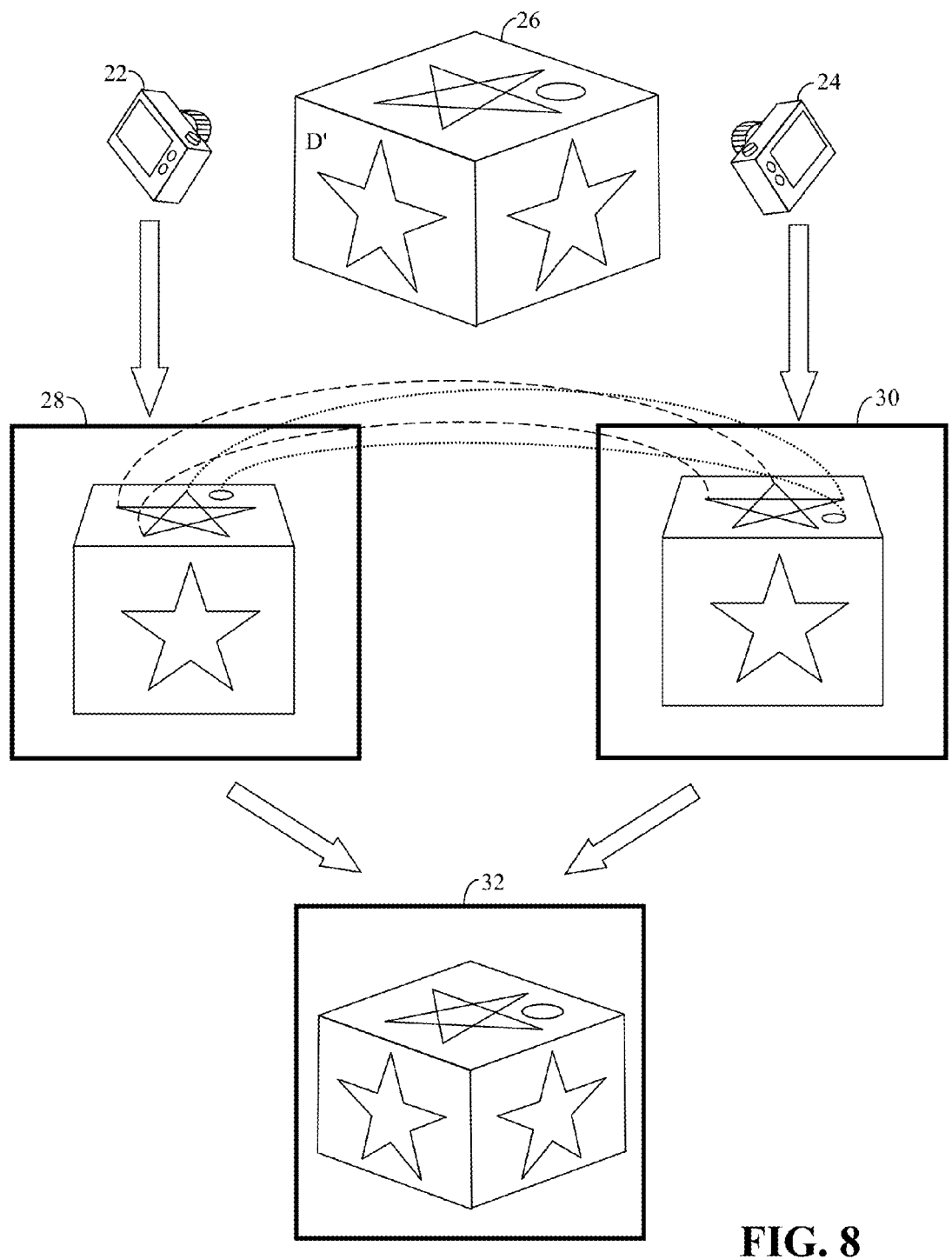
FIG. 8 illustrates homography to re-establish a perspective (i.e., 3D) view from a stereo pair of image taken of a common scene.

For example in FIG. 8, cameras 22 and 24 each take a picture of a 3D scene of a cube 26 from different points of view. From the view point of camera 22, cube 26 looks as shown in 2D image 28, and from the view point of camera 24, cube 26 looks as shown in 2D image 30. Homography permits one to identify correlating points, some of which are shown by dotted lines for illustration purposes. This permits both 2D images 28 and 30 to be stitched together to create a 3D image, as shown in image 32. Thus, automatically finding correspondence between pairs of images is the classic problem of stereo vision. Integral to this, however, is the identifying of feature points in the pairs of images, and the matching of corresponding feature points in the pairs of images.

The above discussion of stereo vision, such as epipolar geometry and homography, may be collectively referred to as perspective constraints, particularly as applied to a stereo image pair.

Because of their use in establishing perspective (i.e., 3D) information, feature based correspondence matching algorithms have found wide application in computer vision. Examples of feature based correspondence matching algorithms are the scale-invariant feature transform, SIFT, and the Affine SIFT (or ASIFT). It is noted, however, that feature based correspondence matching algorithms such as SIFT and Affine SIFT purposely exclude edge points from their analysis, and thus are not well suited for edge detection.

As it is known in the art, the SIFT algorithm scans an image and identifies points of interest, or feature points, which may be individual pixels and describes them sufficiently (typically relative to its neighboring pixels within a surrounding window) so that the same feature point (or pixel) may be individually identified in another image. A discussion of the SIFT transform is provided in U.S. Pat. No. 6,711,293 to Lowe, which is herein incorporated in its entirety by reference. Essentially, SIFT uses a library of training images to identify feature points that are characteristic of a specific object. Once a library of the object's characteristic feature points have been identified, the feature points can be used to determine if an instance of the object is found in a newly received test image. Other examples of feature point extraction are provided in "ORB: an efficient alternative to SIFT or SURF" by Rublee et al., *International Conference on Computer Vision*, 2011.

Principally, feature points (i.e., points of interest) of the object are extracted to provide a "feature description" of a specific object. This description, extracted from training images, can then be used to identify the specific object in a test image containing many object-types. To perform reliable recognition, it is preferred that the features extracted from the training images be detectable under changes in image scale, noise, illumination, and rotation. Feature points usually lie near high-contrast regions of an image. However, since distortion of an object (such as if a feature points is located in an articulated or flexible parts of the object) may alter a feature point's description relative to its neighboring pixels, changes to an object's internal geometry may introduce errors. To compensate for these errors, SIFT typically detects and uses a large number of feature points so that the effects of errors contributed by these local variations may be reduced.

In a typical SIFT application, feature points of objects are first extracted from a set of training images and stored in a database. An object is recognized in a new image (i.e., a test image) by individually comparing each feature point extracted from the new image with the feature points in this database and finding candidate matching features based on Euclidean distance of their feature point vectors. From the full set of matches, subsets of feature points that agree on the object and its location, scale, and orientation in the new image are identified to filter out good matches. Consistent clusters of good matches are then identified. Typically, each cluster of three or more features that agree on an object and its pose is then subject to further detailed model verification and subsequently outliers are discarded. Finally the probability that a particular set of features indicates the presence of a specific object is computed, given the accuracy of fit and number of probable false matches. Object matches that pass all these tests can be identified as correct.

Figure 9:
FIG. 9 illustrates feature point extraction from a sample image.

An example of a SIFT determination of feature points in an image is illustrated in FIG. 9. Possible feature points are first identified, as indicated by dark dots in image 8A. Possible feature points that have a low contrast are then discarded, as illustrate in image 8B. Finally, possible features points located on edges are removed, which leaves the final set of feature points shown in image 8C.

Figure 10:
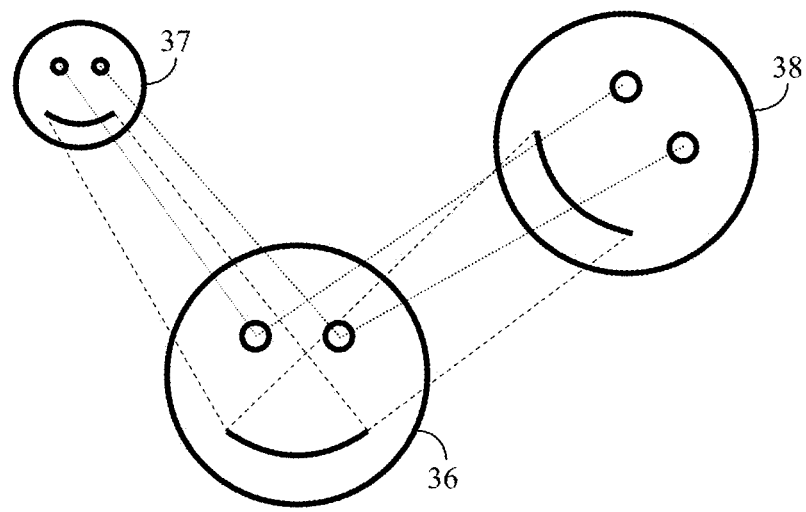
FIG. 10 illustrates the establishment of feature point correspondence using an SIFT transform.

Thus, SIFT permits one to match feature points of an identified object from one image to another. This is illustrated in FIG. 10, where three images of the same object, i.e., a happy face, are shown. For illustration purposes, only four feature points, corresponding to points near the eyes and the corners of the mouth, are shown. As indicated in FIG. 10, SIFT can match feature points from a first face 36 to a second face 37 irrespective of a change in scale. SIFT can also match feature points from first face 36 to a third face 38 irrespective of rotation. However, SIFT has been found to have limited immunity to affine transforms of images. That is, SIFT is limited to the amount of change in the view-angle an imaged object can undergo and still be identified.

A method of extending a SIFT transform to better handle affine transformations is described in "ASIFT: A New Framework for Fully Affine Invariant Image Comparison" by Morel et al, SIAM Journal on Imaging Sciences, vol. 2, issue 2, 2009, which is herein incorporated in its entirety by reference.

Figure 11:
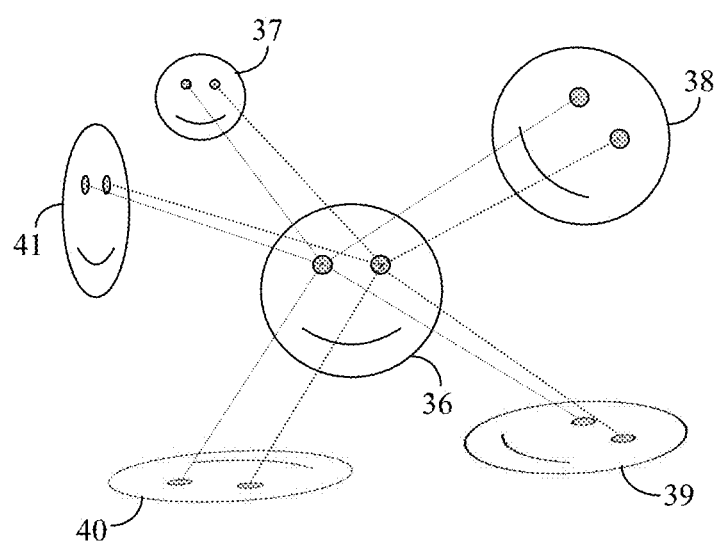
FIG. 11 illustrates the establishment of feature point correspondence using an ASIFT transform.

With reference to FIG. 11, an Affine SIFT would be better able to match feature points from first face 36, to representations of the same object that have undergone affine transformations, as illustrated by happy faces 39, 40, and 41.

Figure 12:
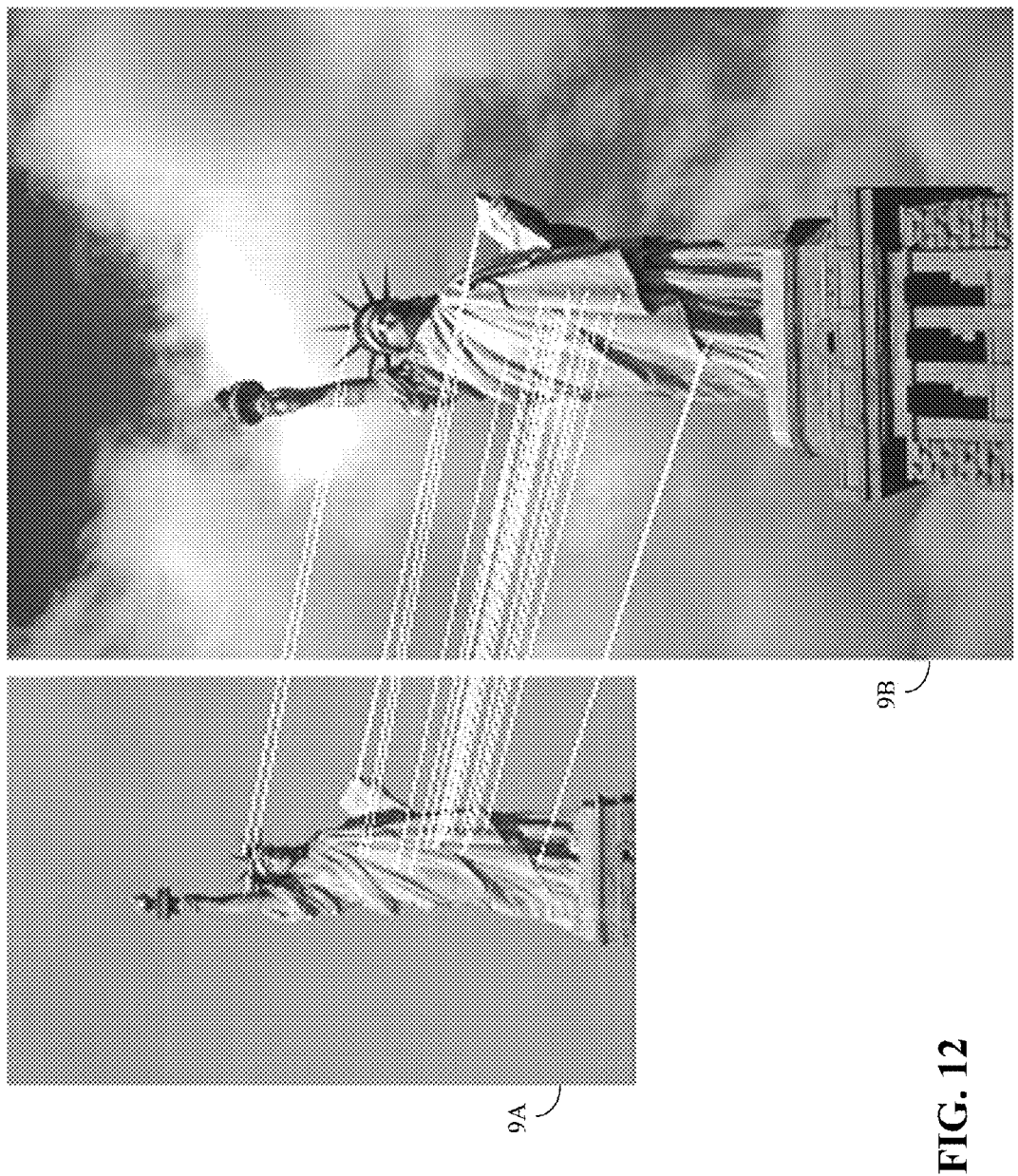
FIG. 12 is an example of feature point correspondence in two images of a common scene, taken from different a field-of-visions, i.e., FOV.

An example of an application of an Affine SIFT transform is illustrated in FIG. 12, where multiple feature points are matched from a first image 9A of the stature of liberty from a first view angle, to a second image 9B of the statue of liberty from a different view angle and at a different scale.

Figure 13:
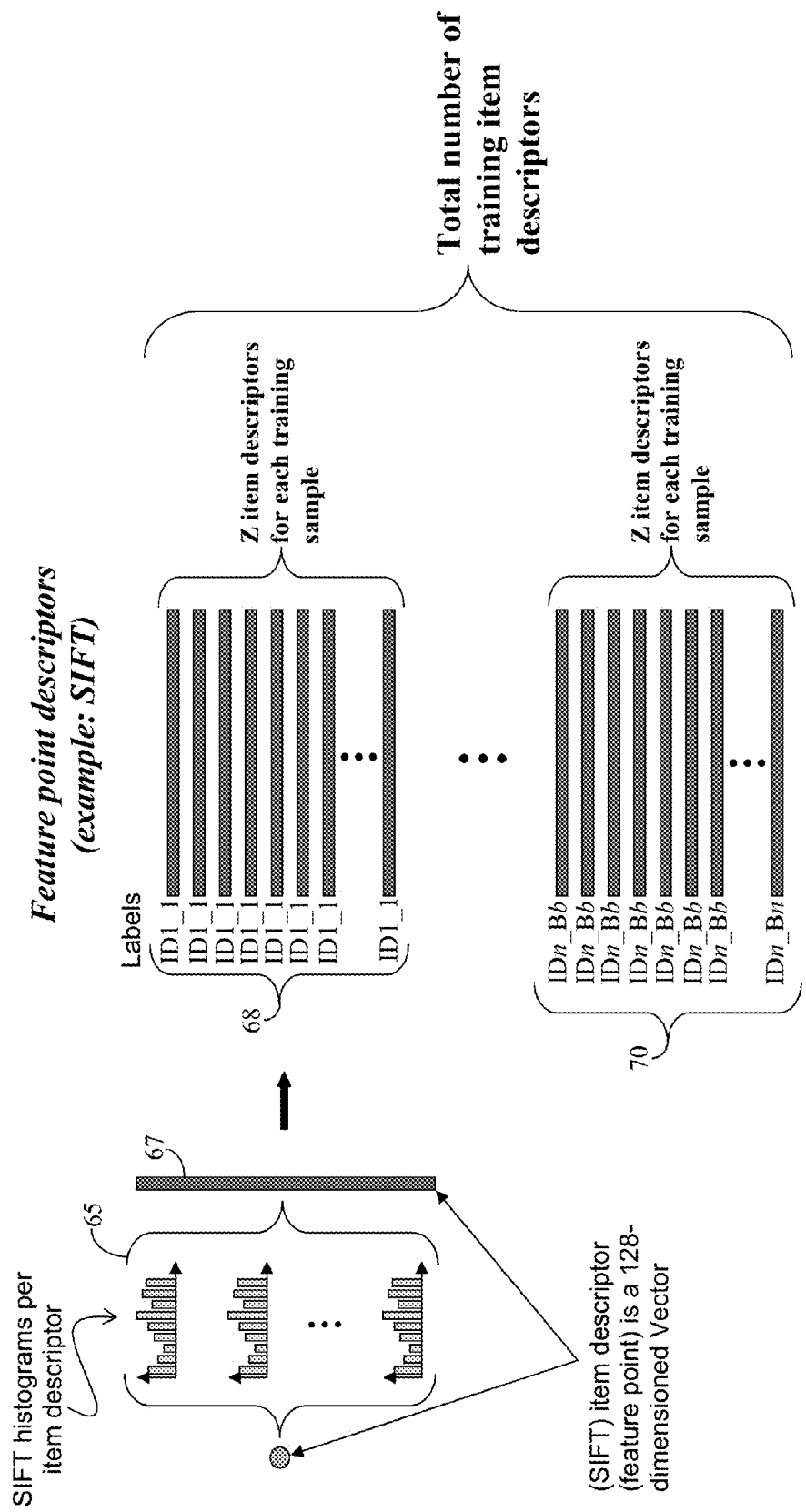
FIG. 13 illustrates that each feature point is defined by a 128-dimension vector comprised of multiple histograms of image pixel characteristics to attempt to uniquely define a pixel, i.e., a feature point.

A quick overview of the feature point extraction function of a SIFT filter/algorithm/module/processor is illustrated in FIG. 13. Each extracted feature point (such as those illustrated in FIG. 9-12) is described by a series of metrics falling to several categories, i.e., distinguishing characteristics. The metrics in each category constitute a histogram. Consequently, a typical SIFT processing algorithm creates a series, or set, of SIFT histograms 65, and each set of histograms collectively describes an individual item descriptor (or feature point or SIFT descriptor). Each of SIFT histograms 65 statistically describes a distinguishing characteristic of the item descriptor relative to neighborhood of pixels (or pixel window) surrounding the item descriptor in the image being processed. The series of SIFT histograms 65 are then collected into single vector 67, which defines one item descriptor. That is, each vector 67 provides sufficient data to identifying an individual pixel within an image. Therefore, each vector 67 describes a single item descriptor (i.e., a feature point or characteristic feature or (feature) pixel) and consists of 128 pieces of descriptive data. Thus, each item descriptor is characterized (i.e., described or identified) by a 128-dimensioned vector 67.

The extracted feature points may then be matched to feature point extracted from other images, and/or they may be used as a training basis to search for other instances of an object in other images. In this case, the extracted feature points are used as training feature point, and typically arranged in a searchable format, such as a hierarchical tree.

For example, the item descriptors may be labeled to identify training sample images from which they were extracted. For example, a first group 68 of item descriptors may be extracted from an image ID1_1. Similarly, a second group (or set) 70 of item descriptors may have been extracted from another image IDb_Bb. The SIFT descriptors corresponding to any given sample image constitutes a set of item descriptors for that image that may be used as a training set to train the SIFT for search another image for an occurrence of the object pictured in the given sample image. For example first image ID1_1 is shown to have a set of Z item descriptors.

In one embodiment, all the sets of items descriptors from sample images of an object to be sought are collected into a composite collection of item descriptors, which is then used to construct a hierarchical tree. One method of achieving this is through a recursive k-means application, as is illustrated in FIGS. 14-16.

Figure 14:
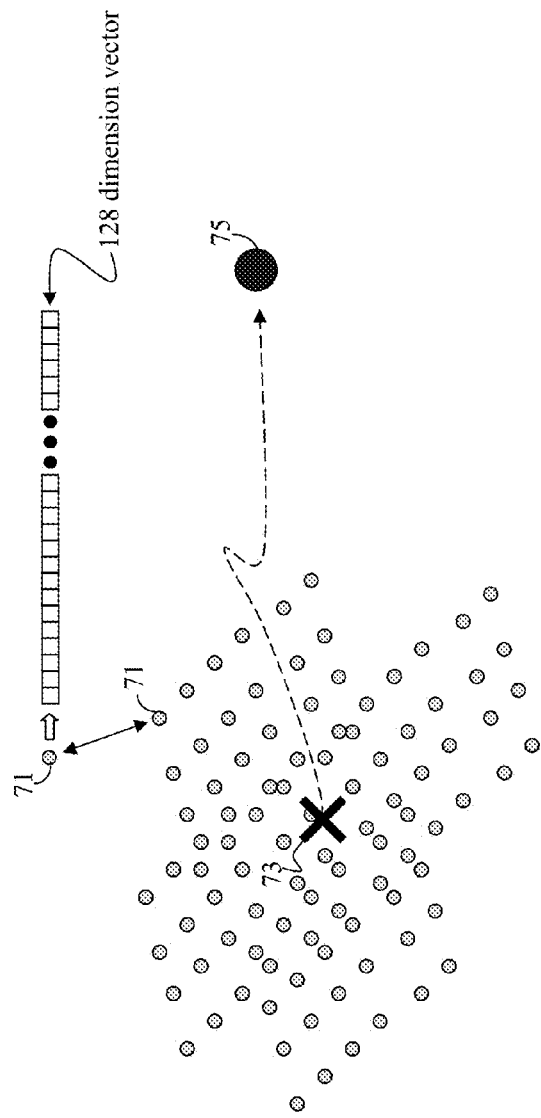
FIGS. 14, 15, and 16 illustrate one method of arranging the information of extracted feature points into a hierarchical tree to ease comparison of feature points betweens images.

With reference to FIG. 14, although each item descriptor, such as point 71, is a 128-dimension vector, for ease of illustration a clustering of lower-dimensioned item descriptors under a single center (preferably the mean value) is shown. This mean value point 73 may define a root node 75 of a hierarchical tree that may be constructed from the clustering of feature descriptors.

Figure 15:
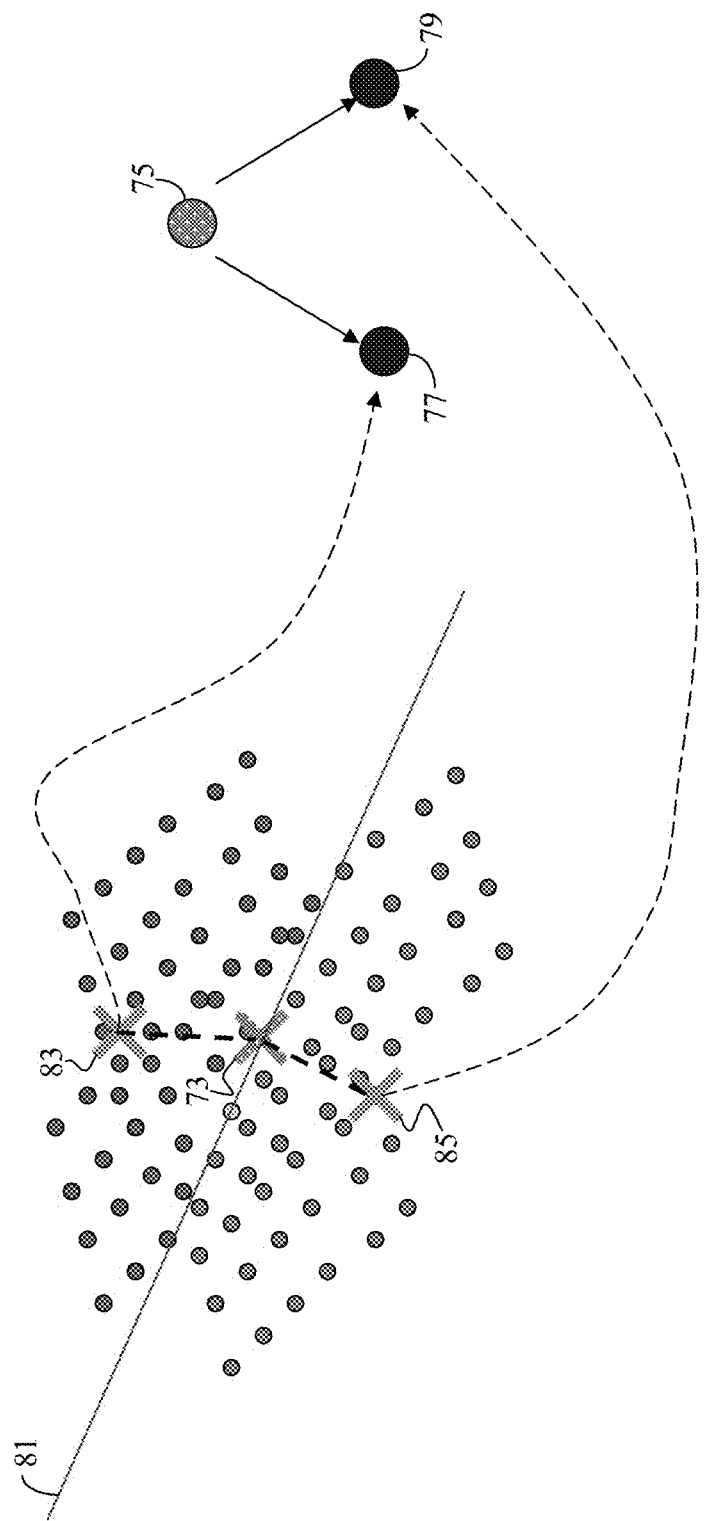

As is illustrated in FIG. 15, the item descriptor data is then split into two groups (for example two substantially equal groups) along mean point 73, as illustrated by dividing line 81. This creates two new center points 83 and 85 in the two newly created groups, respectively. As before, the two new center points 83 and 85 may be defined by the mean of their respective groups of data. Each of center points 83 and 85 may define respective child-nodes 77 and 79 under root node 75.

Figure 16:
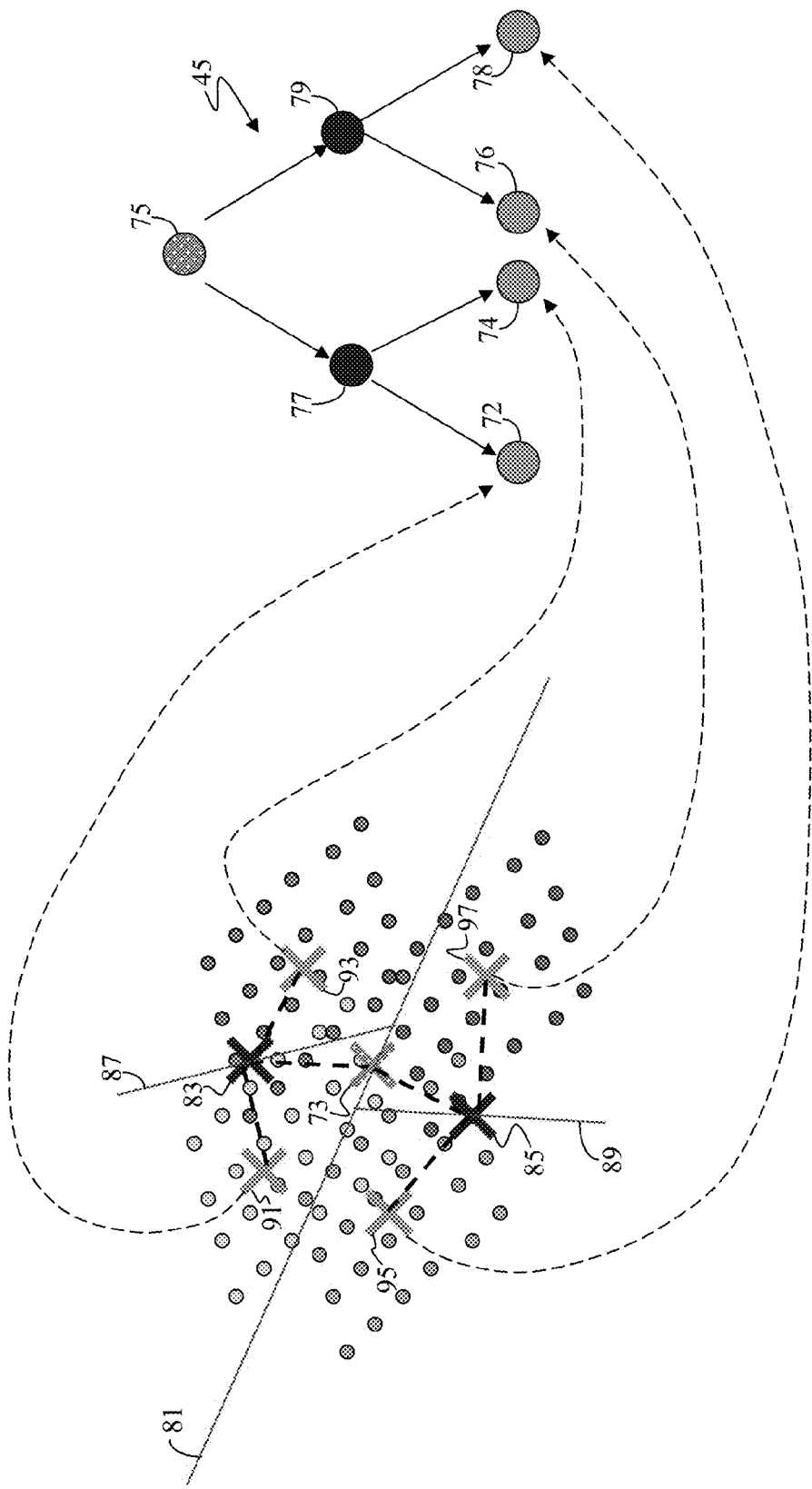

With reference to FIG. 16, each of these two groups may then be divided along their respective center points 83 and 85, as illustrated by dividing lines 87 and 89, respectively. This results in four newly created groups of data, each of which defines a new respective center point 91, 93, 95 and 97. As before, center points 91, 93, 95 and 97 may be defined by the mean of their respective group of data. Center points 91 and 93 may define child-nodes 72 and 74 under node 77 in hierarchical tree 45, and center points 95 and 97 may define child-nodes 76 and 78 under node 79 in hierarchical tree 45. It is to be understood that the data may continue to be divided to define additional child-nodes in simplified hierarchical tree 45. For example, each group of data may continue to be divided until the distance (i.e., the difference) between data within a group is not greater than a predefined maximum.

In a hierarchical tree structure, as it is known in the art, the root node is the top-most node in the hierarchical tree, a parent node is a node that has at least one other node below it and linked to it, a child node is a node linked to a parent node above it, and a leaf node is a node with no child nodes below it. A leaf node is effectively a bottom-most node along a link path (or branch path) downward from the root node. A node along a path downward from the root node to a leaf node may be termed a "path node" or an "intermediate node". Thus, in the example of simplified hierarchal tree 45, node 75 is the root node, nodes 77 and 79 are intermediate nodes (i.e., nodes linked to a parent node above them and linked to a child node below them), and nodes 72, 74, 76 and 68 are leaf nodes (i.e., nodes linked to a parent node above them, but with no child nodes below them).

When determining if an instance of a sought object may be found in an input image, feature points are extracted from the input (i.e., test) image in a similar manner as described above. These extracted feature points may be termed test feature points. The extracted test feature points may then be compared with sample feature points (i.e., training feature points) extracted from sample images (i.e., training images) of the sought object or a specific image selected for comparison. One example of how this may be done is if the extracted training feature points are arranged in a hierarchical tree structure as described above, and the extracted test feature pointes are then distributed into the existing hierarchical tree structure. By observing the distribution, or the clustering, of test feature points within hierarchical tree, one may discern if an instance of the sought object is indeed present. This might be done, for example, be measuring the correlation between the test feature points and the training feature points within the hierarchical tree, and/or by a voting method, as is known in the art.

We now return the main portion of the present invention, which is the sensing (or determination) of pose information from a 3D model of a cable harness, such as produced by a 3D imaging system. This may be generally termed 3D sensing.

Figure 17:
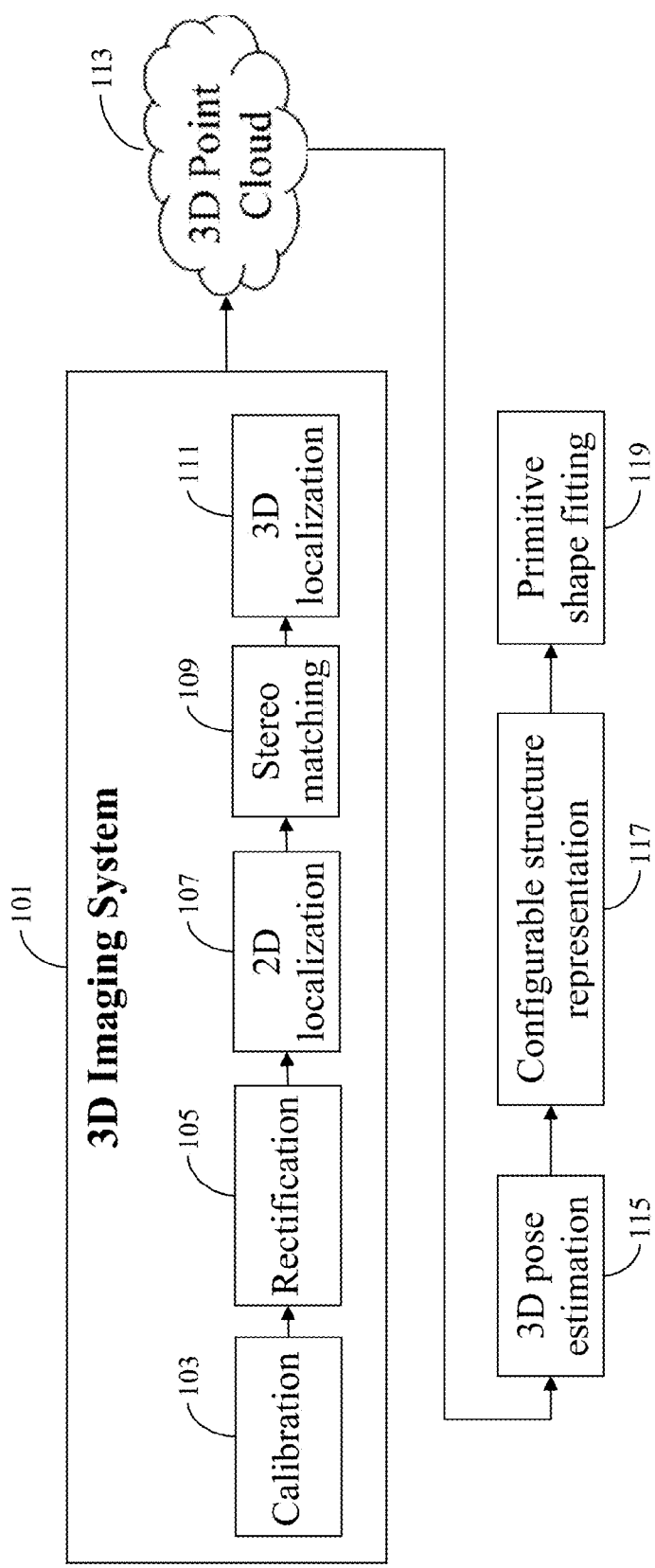
FIG. 17 is an overflow of a preferred embodiment of the present invention.

With reference to FIG. 17, the present system uses a 3D imaging system 101 to generate a 3D model (which includes a 3D point cloud 113) of one or more imaged cable harnesses (or other imaged subject, preferably having a non-rigid body, or a partially non-rigid body). Preferably, 3D imaging system 101 produces a point cloud 113 of the imaged cable harness. Thus, 3D imaging system 101 is the 3D sensing component of the present system.

3D sensing is crucial for robotic arms to effectively grasp and manipulate cables on worktable, and may be implemented using 3D depth sensors such as a range scanner, time-of-flight device, 3D laser scanner, KINECT sensor from MICROSOFT CORP., and/or a range camera.

The presently preferred system, however, implements 3D imaging system 101 using stereo image pairs. That is, the preferred embodiment uses a stereo vision system for 2D localization, 3D reconstruction, and 3D pose estimation of cable harnesses. Further preferably, the system uses a stereo-rig of two webcams (i.e., a stereo pair of cameras) that are synchronized to capture images of cable harnesses (i.e., harness cables).

The system first calibrates the stereo pair of cameras, as indicated by calibration block 103, and rectifies camera images produced by the stereo pair of cameras, as indicated by rectification block 105.

2D localization block 107 then segments the images to identify 2D locations of individual pieces of the cable harness(es). These segments may be defined by means of an connected component (CC) operation and/or segmentation and/or other suitable operation known in the art. The 2D localization block 107 further preferably recognizes that the identified segments are only pieces (or parts) of a whole cable (i.e., cable harness), and selectively groups the pieces of each cable to form a composite whole cable harness. This may be achieved by grouping pieces based on consistency of appearance and geometrical properties. For example, pieces that are close to each other and have a similar appearance (i.e., color and/or shade and/or intensity) may be grouped together. Similarly, two pieces that appear to extend from one another based on a consistent geometry of some features, such as the angle of their sides, may be grouped together. The composite cable harness(es) thus identify(ies) the 2D location(s) of complete cables within each of the stereo image pair.

Stereo matching of the complete cables is then implemented by stereo matching block 109. That is, corresponding cables in each of the two stereo image pairs and their commonly imaged features are identified. This may be implemented by applying tree-based stereo matching to calculate the correspondence between the cable points across the left and right images produced by the stereo pair of cameras.

In 3D localization block 111, the corresponding pair of left-right image pixels is then triangulated to determine the 3D position of the associated cable point(s), such as is explained above. 3D localization block 111 may thus produce a point cloud. If 3D imaging system 101 is implemented by some function that has not yet produced a 3D point cloud (i.e., if a 3D point cloud has not yet been defined by the preceding blocks), then a point cloud may be produced at this time, as indicated by 3D point cloud 113.

3D pose estimation block 115 then estimates the 3D pose (i.e., location and orientation) at each cable position (or at each point (or group of points of predefined size) on the point cloud) by fitting a local plane using the estimated 3D cable points (i.e., the point cloud) and calculating its surface normal.

Configurable structure representation block 117 then defines a configurable representation for the sophisticated cable harness structures, and primitive shape fitting block 119 fits the reconstructed points of each cable into a continuous chain of 3D primitive shapes, such as cylinders and/or rectangular prisms. The estimated cable primitives can be fitted to a structure representation model and the system can control a robotic arm and hand to manipulate the cables using the estimated information.

An exemplary implementation is described below. For illustration purposes, the following system was implemented using a pair of robot arms, each having a hand. Additionally, 2 webcams were used, with an image Resolution of 2592× 1944 pixels, a camera distance (Baseline) of 20 cm., a camera convergence angle of 30 degrees, a tilt angle of 10 degrees with respect to a worktable, a distance to the worktable of 60 cm., and a visible area on worktable of 55 cm×55 cm.

Calibration of the stereo pair of cameras, as illustrate by calibration block 103, may be implemented using standard camera calibration methods. For example, a standard checkboard-based calibration algorithm may be used. In this case, the camera is calibrated by placing a checkerboard is at different positions and orientations and capturing the images. All the camera parameters including focal length and 3D pose can then be calibrated using these images. An example of camera calibration using a checker-board is illustrated in "A flexible new technique for camera calibration", *IEEE Transactions on Pattern Analysis and Machine Intelligence*, Vol. 22, No. 11, pages 1330-1334, 2000, by Z. Zhang, which is herein incorporated in its entirety by reference.

Preferably, rectification block 105 implements homography-based image rectification using the calibrated camera parameters. An example of the operation of Rectification block 105 is illustrated in FIGS. 18A through 18C.

Figure 18A:
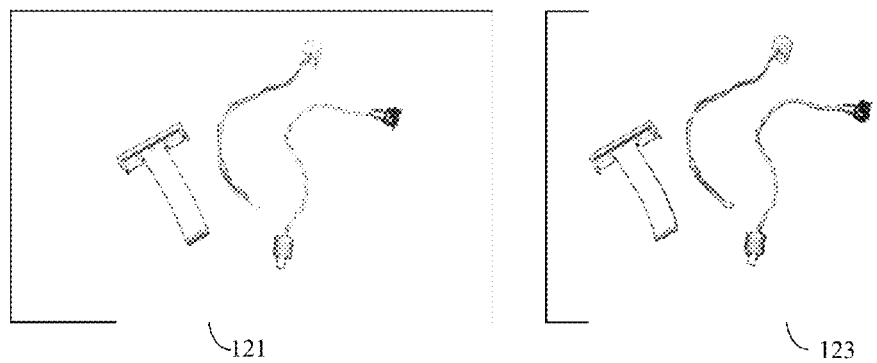
FIGS. 18A, 18B and 18C illustrate the operation of rectification block 105 of FIG. 17.

FIG. 18A shows an initial, non-calibrated left image 121 as produced by a first of the stereo camera pair, and an initial, non-calibrated right image 123 as produced by the second of the stereo camera pair. Rectification refers to the aligning and orienting of the images so that their subjects are aligned to each other as much as possible.

Figure 18B:
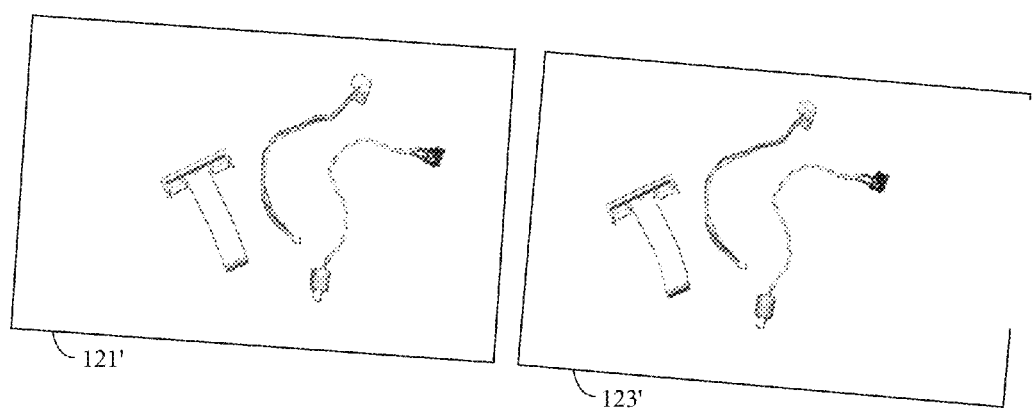

FIG. 18B shows the left and right images, respectively labeled 121' and 123', after partial rectification. Partially rectified left and right images 121' and 123' have a common orientation, but are not yet aligned.

Figure 18C:
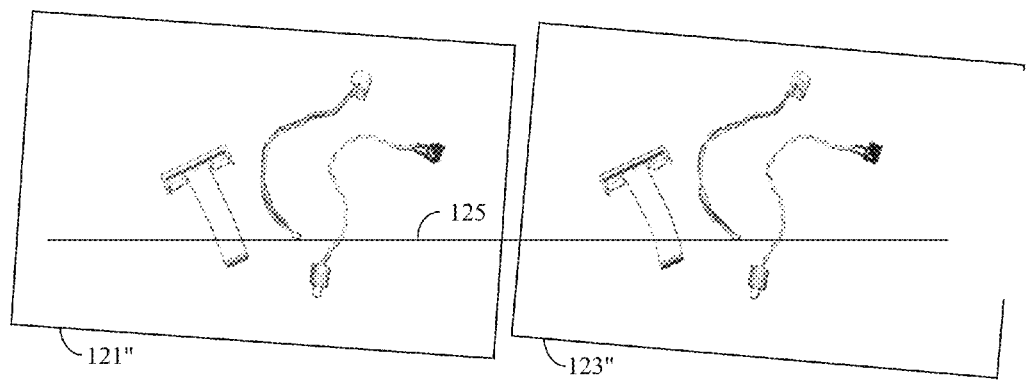

After rectification, as illustrate in FIG. 18C, corresponding points (i.e., pixels) in the rectified left image 121" and rectified right image 123" are located on the same horizontal line, as illustrated by horizontal line 125. As is shown in FIG. 17, rectification block 105 passes the left and right rectified images, 121" and 123", to 2D localization block 107.

Figure 19:
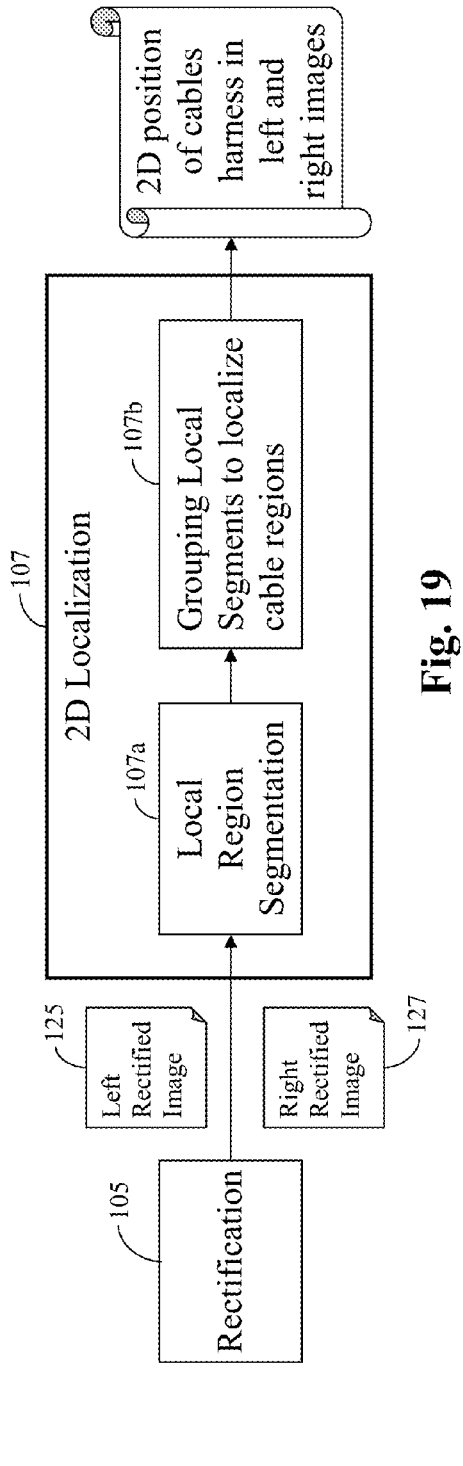
FIG. 19 illustrates the operation of 2D localization block 107 of FIG. 17.

With reference to FIG. 20A, a second example of a rectified left image 125 and a rectified right image 127 are shown. As is illustrated in FIG. 19, the rectified left image 125 and rectified right image 127 from rectification block 105 are passed to 2D localization block 107. Preferably, 2D localization block 107 includes a local region segmentation block 107a and a grouping local segments to localization cable regions block 107b.

Local region segmentation block 107a preferably defines color-based region growing for image segmentation. This would include, for example, a first step of selecting seed points whenever there is a pixel that is unsegmented. Then, for each seed point, the following steps may be applied iteratively. 1) Calculate the color similarity between the pixels in the current region and the nearest neighbor pixels; 2) Include candidate pixels to grow the region if similarity measures are higher than experimentally-set thresholds; and 3) Update the region color distribution and calculate the new principal component.

Alternatively, local segments may be defined using the method described in "Efficient Graph-Based Image Segmentation", by P. Felzenszwalb et al., *IJCV*, 2004, which is hereby incorporated by reference in its entirety.

This can result in multiple independent segments within a common cable harness, as is illustrated in locally segmented left image 125' and locally segmented right image 127' of FIG. 20B. These locally segmented images are then passed to block 170b, whose job is to join the multiple local segments within a common cable harness into a single (a few larger) segment(s) spanning all (or much) of the cable harness, as is illustrated by grouped segments left image 125" and grouped segments right image 127" of FIG. 20C. The local segments (i.e., the cable segments) may be grouped into complete cables by the grouping together nearby cable segments (i.e., within 60 pixels) with similar appearance and consistent geometrical properties (e.g. orientation). Detailed steps may include: (Step 1) Identify the connecting endpoints of each cable segment with respect to its neighboring segments by using morphological dilation; (Step 2) Define a local window around the endpoints over the cable segment and compute the principal components (PCA) of the pixel colors and local shape orientation; (Step 3) Compute the color similarity and shape orientation similarity between neighboring segments using the PCA values computed in step (2); (Step 4) Group the neighboring segments if both similarity measure is higher than a experimentally-set threshold.

The locations of the composite, grouped segments define the 2D position of the cable harness, which is output from 2D localization block 107 to stereo matching block 109, as is shown in FIG. 17.

Another example of locally group segmentation of cables in a left image 131' and a right 133' is shown in FIG. 21A. The results of grouping the local group segments to define entire cable harnesses, defined by larger segments, and preferably a single larger segment (such as a connected component segment), for left image 131" and right image 133" are illustrated in FIG. 21B.

Figure 22:
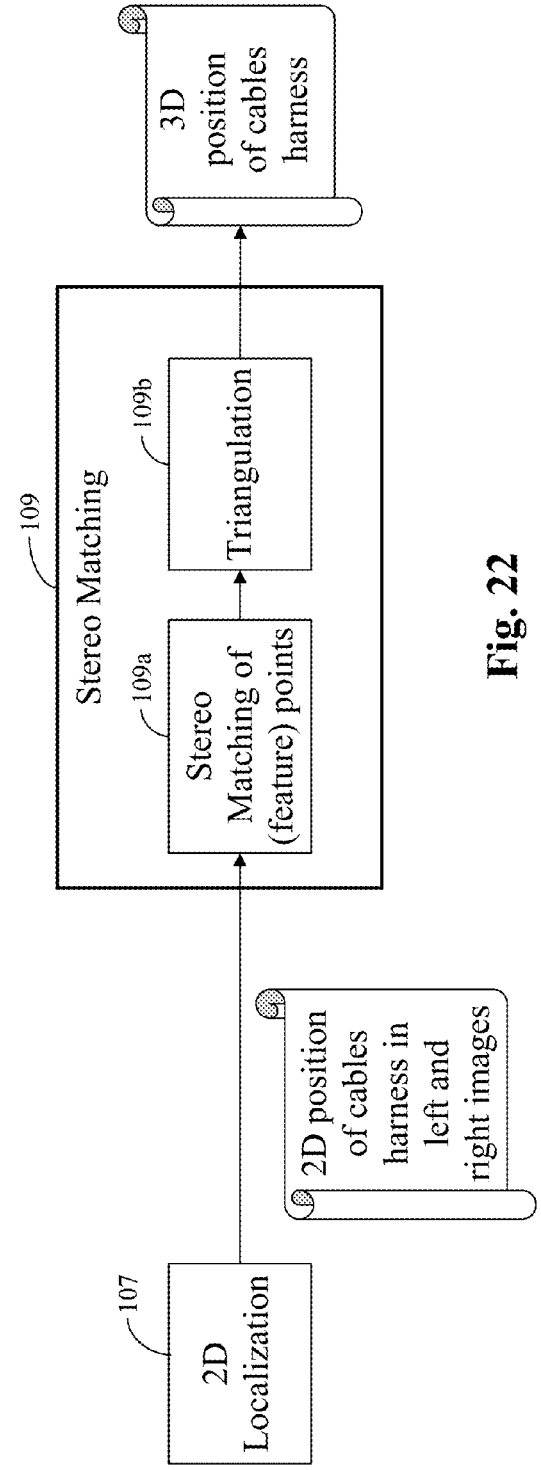
FIG. 22 illustrates the operation of stereo matching block 109 of FIG. 17.
Figure 23A:
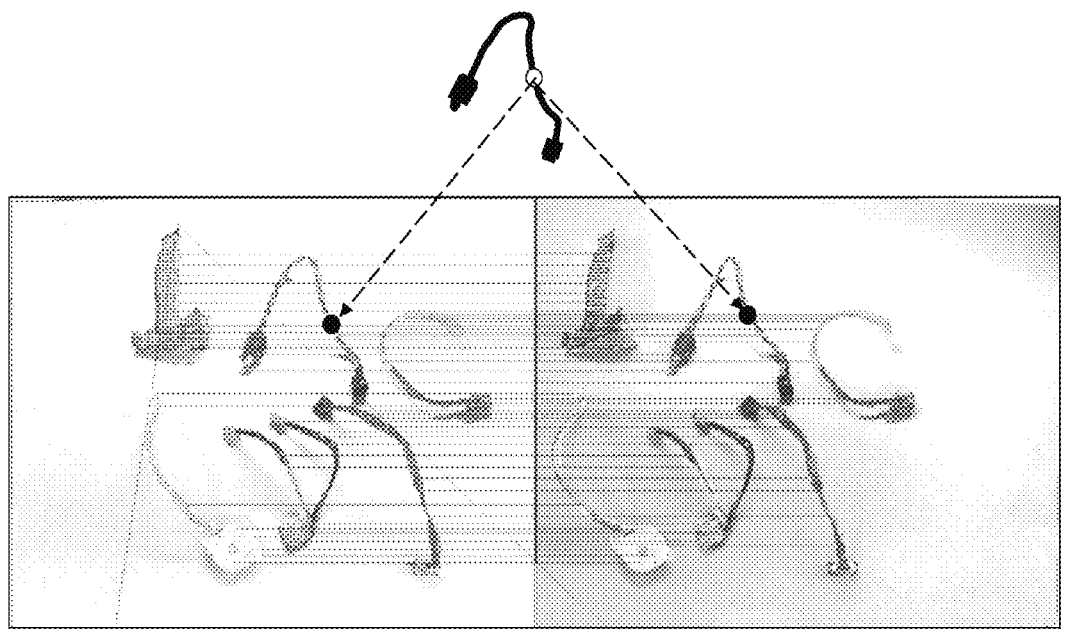
Figure 24:
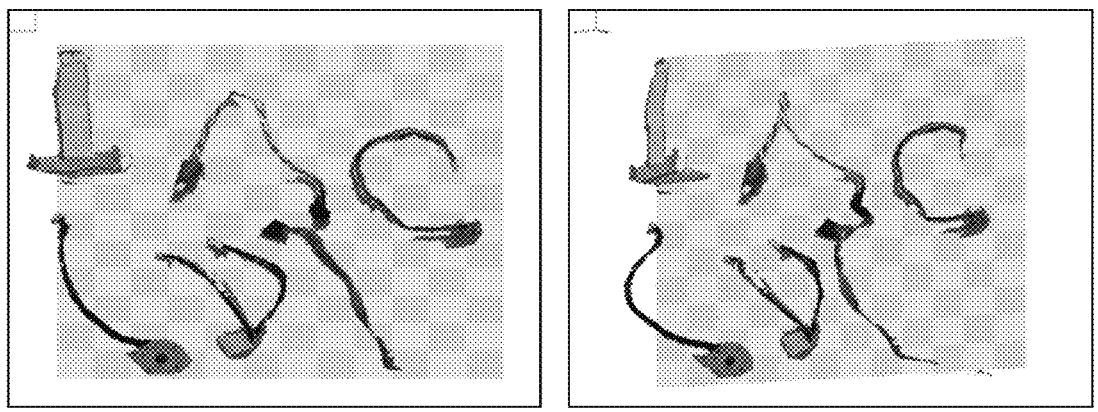
FIG. 24 illustrates a reconstructed 3D cable geometry shown in two different views.

With reference to FIG. 22, the 2D position (and composite segment groups) of the cable harness in the rectified left and right images is passed from 2D location block 107 to stereo matching block 109, as was also shown in FIG. 17 above. Stereo matching block 109 serves two functions. First it matches corresponding point in the rectified left and right image, as is illustrated by stereo matching of (feature) points block 109a, and generates a 3D point cloud of the physical cable harnesses represented in the rectified left and right images, as is illustrated by triangulation block 109*b*. This results in the 3D position of cable harnesses relative to a reference point (and/or relative to each other). Since the 3D position of cable harnesses is defined by the 3D position of each matched (i.e., corresponding) point in the rectified left and right images, it also defines a 3D point cloud for each cable harness. FIGS. 23A and 24 provide an example of the operation of stereo matching block 109.

With reference to FIG. 23A, an example of how the stereo matching of points (such as feature points) may be achieved as follows. For each cable point in the left image, find its corresponding point in the right image. Examples of how this may be done are provided above, particularly in the discussion of the SIFT algorithm. Other correspondence matching algorithms may also be used. After rectification, the corresponding points in the left and right images lie in the same horizontal line. Feature base descriptors are also computed. For example, the ORB-based feature descriptor may be computed at the left-image pixel, and one can limit the search for a corresponding pixel in the right image to the horizontal line that passes through the pixel being considered in the left image. That is, one can search the right-image pixels in the same row to find the best match with the closest feature values. This is illustrated in FIG. 23A by a multiple illustrated horizontal lines along corresponding (i.e., matched) left and right pixels.

Preferably, outliers are systematically rejected. This can be achieved by using global geometry constraint to reject pixels (i.e., points) with disparities out of range.

Triangulation block 109*b* then defines the 3D position for the points to define a perspective representation of a cable using the matched points in the left and right images. This may be achieved by using the homography/epipolar/triangulation and/or other techniques discussed above. For example, FIG. 23A shows the triangulation of a pair of corresponding pixels in left and right images determines a cable point in the 3D space.

This triangulation operation may include the following. For each cable point, the 3D position is determined by the intersection of two lines, one connecting its left-image pixel and the left camera optical center, and another connecting the corresponding right-image pixel and the right camera center. For example with reference to FIG. 23B, let (x,y,z) be the 3D point, and (u,v) and (u',v') denote the corresponding pixels in the left and right image, and let 3-by-4 matrices P and P' denote the camera matrices for the left and right cameras. Then Pi denotes the i-th row P and Pi' denotes i-th row of P'. One can then use the camera projection equation to result in the equation of FIG. 23B.

As an added example, FIG. 24 illustrates a reconstructed 3D cable geometry shown in two different views.

The thus defined 3D point cloud is passed to 3D pose estimation block 115, which estimates the pose of each part (preferably each point) in the point cloud that defines a cable. In so doing, 3D pose estimation block 115 also estimates the pose of different parts of the imaged cable. A preferred method to achieve this is to determine the surface normal at each point in the point cloud. The surface normal estimation may be implemented as follows. At each cable point, find all cable points in a local window, of preferably 60 pixels. Use the estimated 3D cable points in the local window to fit a plane onto the window, and then estimate the local normal direction to that plane.

Figure 25:
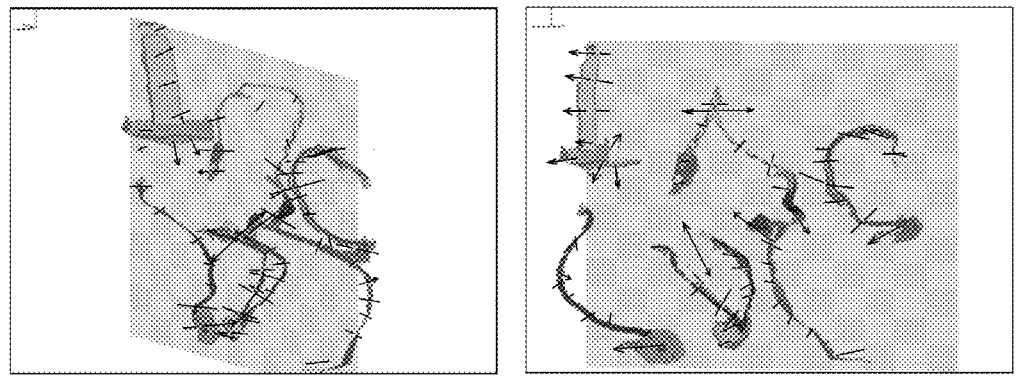
FIG. 25 illustrates the estimating of surface normals at points on a cable, as implemented by 3D localization block 111 of FIG. 17.

The estimating of surface normals at points on a cable is illustrated in FIG. 25. The surface normals estimated using the 3D cable point clouds (two views) at specified locations are illustrated by small arrows of various arrow head sizes.

Figure 26:
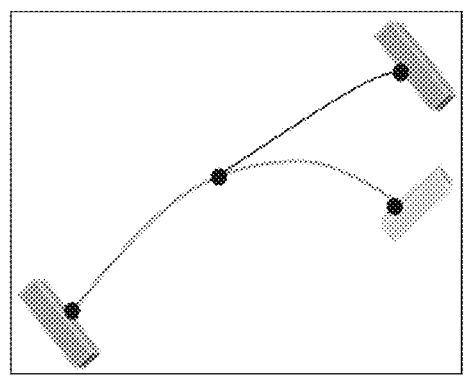
FIG. 26 illustrates the defining of a cable harness into in terms of cable units, nodes and connectors.

The pose information then passes to configurable structure representation block 117, one of whose objective is to identify nodes (or node markers), cable segments (or cable units), and connectors. The nodes preferably define the opposing ends of (non-rigid) cable segments (i.e., cable units), and each (non-rigid) cable segment is joined to a connector or to another (non-rigid) cable segment at a node. Stated more simply, a cable harness consists of a number of cable units, connectors, and nodes. Nodes are defined as the ends of the cable units. Each connector is attached with one end (node) of a cable unit. An example of a cable harness consisting of 3 cable units, 4 nodes, and 3 connectors is illustrated in FIG. 26.

Figures 27, 28:
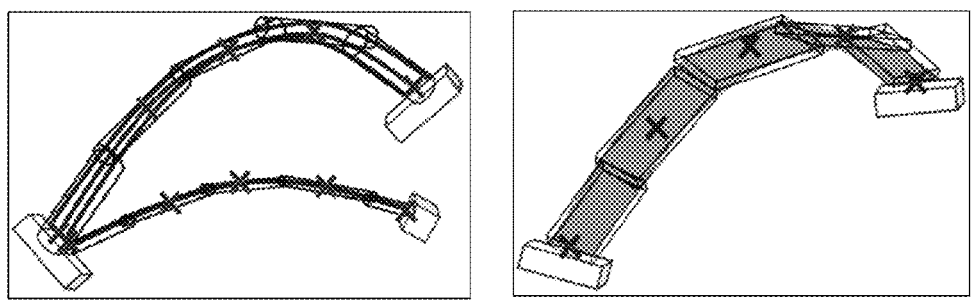
FIG. 27 is an example of round cable units represented by cylinders, as the primitive geometric shape.
FIG. 28 is an example of flat cable units represented by rectangular prisms, as the primitive geometric shape.

The cable unit is preferably defined by a continuous chain of primitive shapes, which can be cylinders or rectangular prisms. The primitive shapes function as bounding envelops of the local cable unit areas. It is thus important to estimate them from images for robotic operations on cables. Connector may be defined by rectangular prisms or by associated CAD data. A node may be defined by a 3D point. FIG. 27 is an example of round cable units represented by cylinders, as the primitive geometric shape. FIG. 28 is an example of flat cable units represented by rectangular prisms, as the primitive geometric shape.

The representation of cable harnesses may be implemented as follows: At each cable unit, a set of cable points are needed as centers of primitive shapes. These center points may be manually specified in the image or automatically calculated by uniform division of the reconstructed cable unit points. At each center point, a primitive shape is fitted with the reconstructed cable points in the local area and determines its size. For example, for a cylinder, a diameter and length may be determined. Similarly, for a rectangular prism, its height and width may be determined. These sizes are stored so that one can move along a cable unit by counting its representative geometric shapes. If desired, the geometric shapes may be of a fixed (predefined) lengths. For examples, all the cylinders may have a first common length and/or all the rectangular prisms may have a second common length. If desired, the first and second common lengths may be the same.

The 3D orientation of the local primitive shapes also needs to be determined, especially for the flat cable units. A sequence of estimated 3D cable primitives (cylinders) using the 3D cable point clouds and surface normals (two views) is illustrated in FIG. 29.

Figure 30:
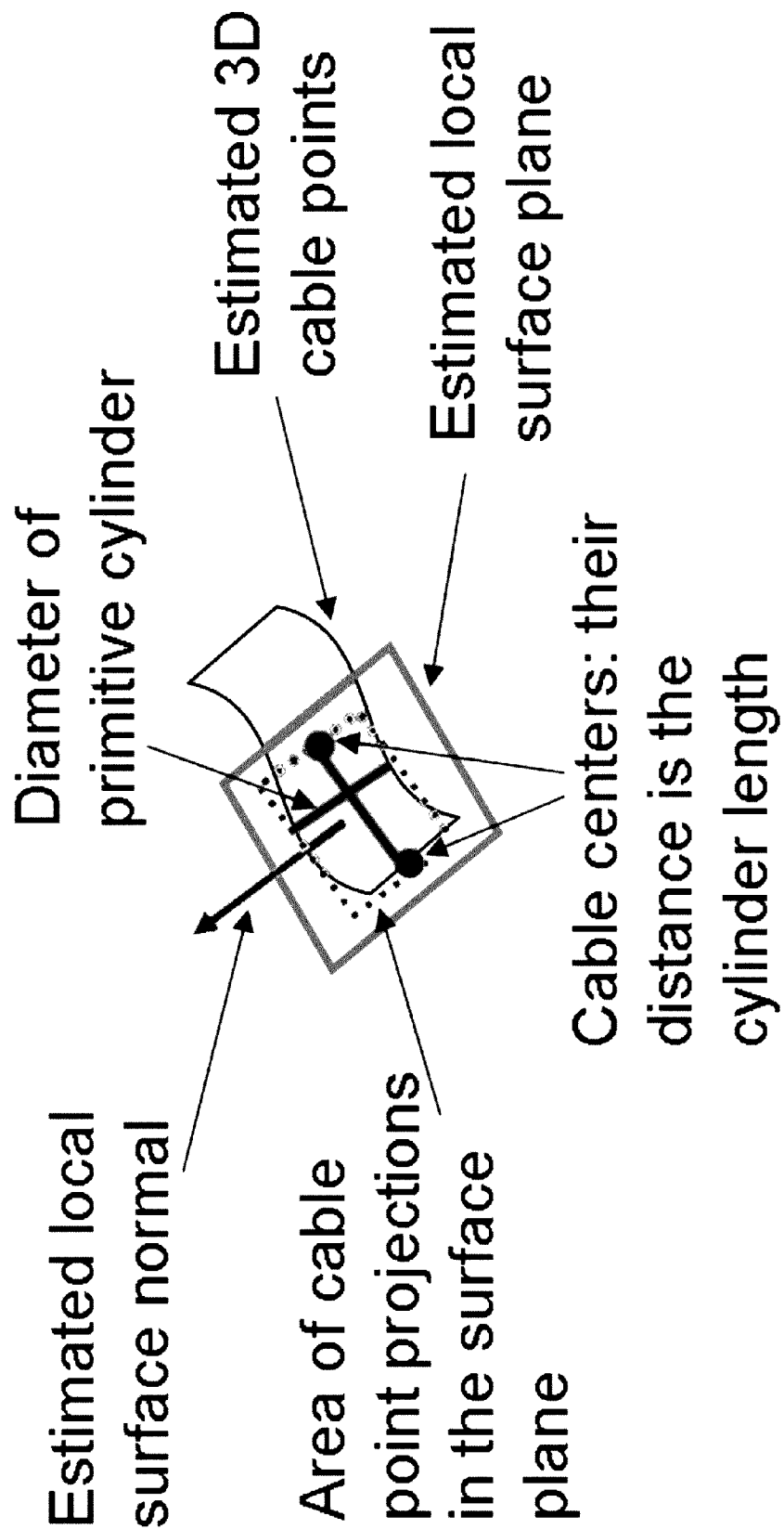
FIG. 30 illustrates geometric model fitting to estimate cable primitives.

With reference to FIG. 30, geometric model fitting to estimate cable primitives may be divided into several parts. First, one specifies or detects cable center points, preferably by uniform division. Given the cable centers, the distance of neighboring centers decides the length of local primitive cylinders. One then projects the cable points into the estimated local surface plane and finds the area of the projections. The cable points are then projected to the direction perpendicular to the connecting line of labeled cable centers, and the range decides the diameter of the local primitive cylinder.

Figure 31:
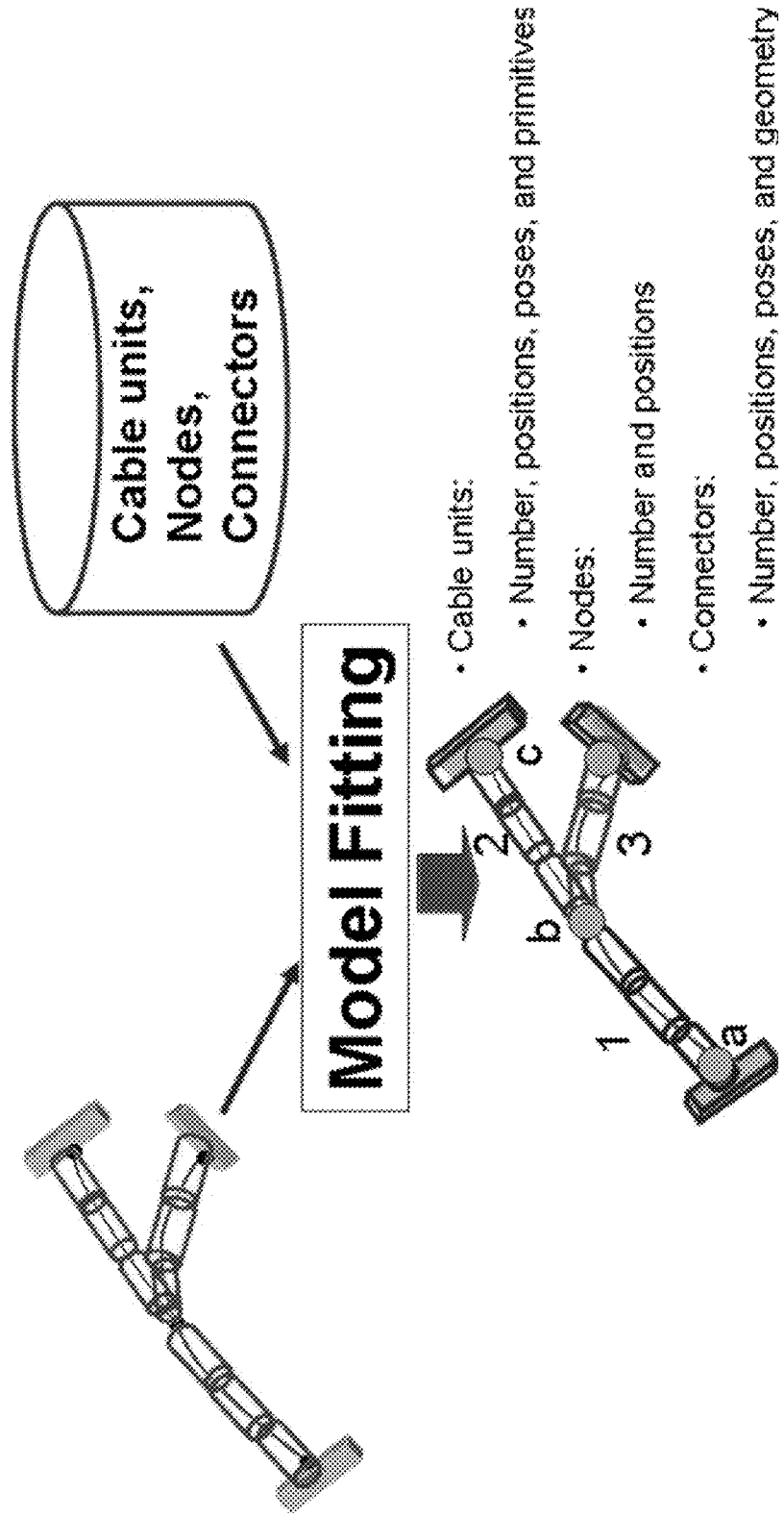
FIG. 31 illustrates the function of primitive shape fitting block 119 of FIG. 17.

Thus, the function of primitive shape fitting block 119 may be illustrated by illustrated by FIG. 31. As is illustrated, the reconstructed cable primitives are fitted with the structure representation model to obtain a concise interpretation of the cable geometry.

Figure 32:
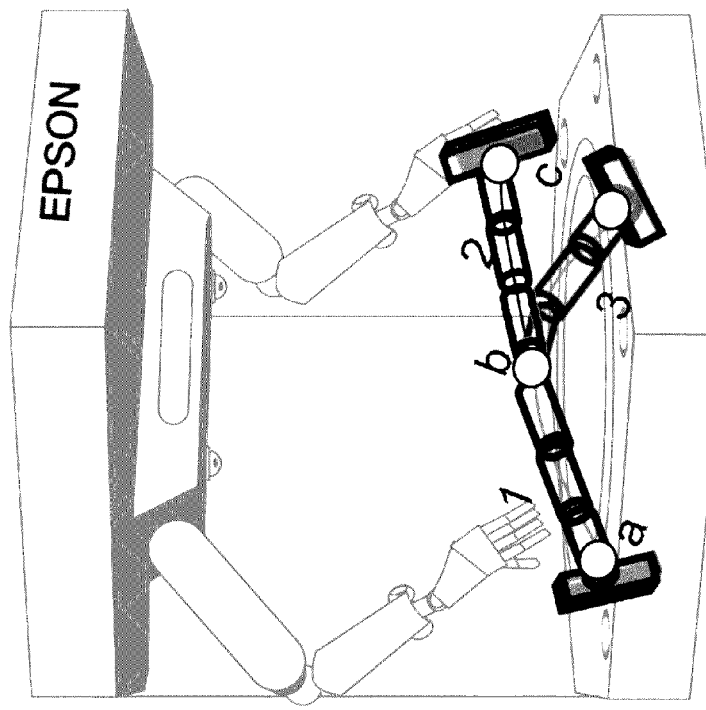
FIG. 32 illustrates a robot utilizing the present invention to manipulate a cable harness.

With reference to FIG. 32, given the interpreted cable structure, a robot hand can be made to easily operate with the cable. For example, if a robot hand is programmed to pick a cable at the second primitive of Cable Unit 2 between Node b and c, the present invention can provide sufficient information to fulfill this operation.

Thus, the robot can be made to recognize and manipulate different (and previously unknown) types of cable harnesses in an assembly line. This is achieve by a 3D cloud of a given cable harness. Pose information of specific parts of the cable harness are determined from the 3D point cloud, and the cable harness is then re-presented as a collection of primitive geometric shapes of known dimensions, whose positions follow the spatial position of the re-presented cable harness. Because the normal direction at each surface point of the harness is known, if desired, the orientations of the primitive geometric shapes may also be made to follow the changes in orientation of the represented cable harness. The robot can then manipulate the cable harness by using the simplified representation as a reference.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A harness visualization system, comprising:
an image capture device configured to capture an images of a physical harness having a connector and a non-rigid cable;
a robot comprising a manipulating part;
a controller having a recognition part to identify connectors in the captured image based on physical characteristics of the connectors as viewed in the captured image in the absence of any symbolic markings on the connectors, to distinguish between the connector and the non-rigid cable of the cable harness shown in the captured image, to create a cable harness model of the image-captured physical harness, and to assign identifiers correlating different parts of the cable harness model to corresponding parts of the cable harness shown in the captured image;
wherein:
the controller represents said cable harness model in terms of a set of predefined primitive shapes, wherein IF the non-rigid cable consists of plurality of wires substantially coupled linearly side-by-side each other to the connector, THEN the set of predefined primitive shapes includes of a train of one of rectilinear prisms and curvilinear prisms. ELSE the set of predefined primitive shapes includes a train of the other of the rectilinear prisms and curvilinear prisms; and
the robot grasps a designated part of the physical cable harness according to the assigned identifier of the designated part in the captured image.

2. The harness visualization system of claim 1, wherein an identifier is assigned to the connector, the designated part is the connector, and the robot further aligns the grasped connector to a specific receptacle of the connector.

3. A harness visualization system comprising:
a robot comprising a manipulating part;
a controller having a recognition part to recognize different types of cable harnesses;
a physical harness having a non-rigid cable and a connector;
wherein the robot manipulates the connector based on a recognition result from the controller after the controller recognizes the physical harness;
wherein the controller includes a three-dimensional, 3D, image capturing system to create a 3D cable harness model of the image-captured physical harness;
wherein the controller further includes a cable structure representation module representing said 3D cable harness model in terms of a set predefined primitive 3D shapes;
wherein:
IF the non-rigid cable consists of a plurality of wires substantially coupled linearly side-by-side each other to the connector, THEN the set of predefined primitive 3D shapes includes of a train of rectangular prisms;
ELSE the set of predefined primitive 3D shapes includes a train of cylinders.

4. The harness visualization system of claim 3, wherein the set of predefined primitive 3D shapes spatially track the path of the non-rigid cable and correspond to a separate part of the physical harness.

5. The harness visualization system of claim 3, wherein said 3D cable harness model uses a rectangular prism as the primitive 3D shape to represent the connector.

6. The harness visualization system of claim 5, wherein the manipulating part consists of a manipulating arm configured to grasp the physical harness at a location corresponding to a selected one of the primitive 3D shapes.

7. The harness visualization system of claim 3, wherein the widths of said rectangular prisms substantially span across the side-by-side wires they represent, and the diameters of said cylinders substantially encompass the portion of the non-rigid cable they represent.

8. The harness visualization system of claim 3, wherein all rectangular prisms have a common first length, and all cylinders have a common second length.

9. The harness visualization system of claim 1, wherein:
the controller divides the non-rigid cable in the captured image into a plurality of cable segments, each cable segment being one of said different parts of the cable harness and being assigned a different identifier;
the designated part is a specific one of said cable segments, and the robot grasps a portion of the physical harness that corresponds to the designated cable segment as identified by its corresponding identifier.

10. A cable harness visualization system comprising:
a robot comprising a manipulating part;
a controller having a recognition part to recognize different types of cable harnesses;
a physical harness having a non-rigid cable and a connector;
wherein the robot manipulates the connector based on a recognition result from the controller after the controller recognizes the physical harness;
wherein the controller includes a three-dimensional, 3D, image capturing system to create a 3D cable harness model of the image-captured physical harness;
wherein said 3D imaging system includes:
a stereo image capture device producing stereoscopic image pairs of physical cable harnesses, each stereoscopic image pair including a first image and a second image;
a two-dimensional, 2D, cable localization module localizing commonly imaged physical cable harnesses in the first and second images in a stereoscopic image pair, said 2D cable localization module further identifying corresponding pixel pairs in the first and second images, each corresponding pixel pair including a first pixel from the first image and a second pixel from the second image, both first and second pixels corresponding to a commonly imaged point on the commonly imaged physical cable harness that produced the stereoscopic image pair;

a 3D cable localization module creating a 3D point cloud representation of each commonly imaged physical cable harness in 3D space in accordance with perspective constraints and the commonly imaged physical cable harness's corresponding pixel pairs;

a 3D pose estimator determining cable pose orientations of commonly imaged physical cable harnesses in said 3D space in accordance with their corresponding 3D point clouds, said 3D pose estimator determining a surface normal direction for selected points within said 3D point clouds relative to a neighborhood-of-points of predefined size surrounding each selected point, said 3D cable harness model being defined by a corresponding 3D point cloud and corresponding cable pose orientations.

11. The cable harness visualization system of claim 10, wherein said 3D pose estimator determines a surface normal direction for a selected point by;

defining a local window around the selected point;

identifying the 3D points within the defined local window;

fitting a 2D plane on to the identified 3D points, and estimating the local 3D normal direction of the fitted 2D plane.

12. The cable harness visualization system of claim 10, wherein said 2D cable localization module segments said first and second image to define image segments, and each image segment defines a silhouette of an imaged physical cable harness.

13. The cable harness visualization system of claim 12, wherein each image segment is defined by:

(I) for each unsegmented part of an image, selecting a seed point within the unselected part, and for each selected point iteratively applying the following steps:

(i) determine similarity measures for the color similarities between the seed point and its nearest neighbor pixels, said nearest neighbor pixels being candidate pixels;

(ii) join the seed point and the candidate pixels if the similarity measures are higher than a predefined threshold, and IF any of the joined pixels are a part of an existing image segment, THEN the existing image segment is grown to include the joined pixels, ELSE the joined pixels define a new image segment;

(iii) determine a region color distribution for the image segment of step (ii) and calculate its principle component;

(II) returning to step (I) until all points within an image have been selected, in turn.

14. The cable harness visualization system of claim 13, further including after step (II):

(III) joining together any proximate image segments having a region color distribution similarity within a predefined first threshold and a geometric properties similarity within a predefined second threshold.

15. The cable harness visualization system of claim 14, wherein proximate image segments are defined as image segments separated by not more than 60 pixels.

16. The cable harness visualization system of claim 14, wherein the region color distribution similarity and the geometric properties similarity between image segments are determined from their respective principle components, within predefined thresholds.

17. The cable harness visualization system of claim 13, further including after step (II):

(a) determining a first set of feature descriptors for the image segments in said first image and a second set of feature descriptors for image segments in said second image; and (b) defining said corresponding pixel pairs by matching pairs of corresponding feature descriptors between the first and second sets of feature descriptors.

18. The cable harness visualization system of claim 17, wherein step (b) includes:

identifying as a candidate matching descriptor, a feature descriptor in said second set that matches a given feature descriptor in said first set; and IF its relative position within said second image differs from the relative position of the given feature descriptor in said first image by more than a predefined margin, THEN discarding said candidate matching descriptor, ELSE deeming said candidate matching descriptor as a corresponding pixel pair to the given feature descriptor.

19. The cable harness visualization system of claim 17, wherein step (b) feature descriptors in said first and second sets of feature descriptors are matched by means of a tree-based feature matching scheme.

20. The cable harness visualization system of claim 10, wherein said 3D pose estimator implements the following steps:

(a) applying global homography to said first and second images to reject corresponding pixel pairs in said first and second images that do not satisfy global homography constraints; and (b) for each corresponding pixel pair not rejected in step (a), applying local homography in accordance to its corresponding image segments to further remove from each image segment any points that meeting local homography constraints.

* * * * *